United States Patent
Kutz et al.

(10) Patent No.: US 11,296,735 B1
(45) Date of Patent: Apr. 5, 2022

(54) DISTRIBUTED DIGITAL PRE-DISTORTION TRAINING

(71) Applicant: QUALCOMM Incorporated, San Diego, CA (US)

(72) Inventors: Gideon Shlomo Kutz, Ramat Hasharon (IL); Amit Bar-Or Tillinger, Tel-Aviv (IL); Ori Barak, Beer sheva (IL); Ran Berliner, Kfar-Aviv (IL); Assaf Touboul, Netanya (IL); Ori Ben Shahar, Petach Tikva (IL); Noam Zach, Kiryat Ono (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/210,327

(22) Filed: Mar. 23, 2021

(51) Int. Cl.
*H04B 1/04* (2006.01)

(52) U.S. Cl.
CPC ... *H04B 1/0475* (2013.01); *H04B 2001/0425* (2013.01)

(58) Field of Classification Search
CPC .............. H04B 1/0475; H04B 2001/0425
See application file for complete search history.

(56) References Cited

U.S. PATENT DOCUMENTS

| | | | | |
|---|---|---|---|---|
| 7,280,583 B1* | 10/2007 | Kowalewski | ......... | H04B 1/711 375/144 |
| 8,385,391 B2* | 2/2013 | Balasubramanian | ......... | H04L 25/03343 375/219 |
| 2011/0170630 A1* | 7/2011 | Silverman | ......... | H04L 25/03343 375/296 |
| 2017/0366226 A1* | 12/2017 | Weissman | .............. | H04B 3/487 |

OTHER PUBLICATIONS

Esmailzadeh et al. "Pre-RAKE diversity combination for direct sequence spread spectrum communications systems", Proceedings of ICC '93—IEEE International Conference on Communications, pp. 463-467 (Year: 1993).*

* cited by examiner

*Primary Examiner* — Vineeta S Panwalkar
(74) *Attorney, Agent, or Firm* — Holland & Hart LLP

(57) ABSTRACT

Methods, systems, and devices for wireless communications are described. A base station may transmit, to each user equipment (UE) of a set of UEs, a different respective set of one or more training parameters for a digital pre-distortion procedure. Some or all of the UEs may determine one or more respective training values based on the one or more training parameters, where the training values from the UEs support the base station computing a set of non-linearity coefficients for the digital pre-distortion procedure. The base station thus may receive training parameters from some or all of the UEs and determine the set of non-linearity coefficients based thereon. The base station use the non-linearity coefficients to perform the digital pre-distortion procedure for one or more downlink transmissions, to one or more UEs of the group of UEs used for training, or to one or more other UEs.

30 Claims, 14 Drawing Sheets

US 11,296,735 B1

DISTRIBUTED DIGITAL PRE-DISTORTION TRAINING

FIELD OF TECHNOLOGY

The following relates to wireless communications and to distributed digital pre-distortion training.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support distributed digital pre-distortion training. Generally, the described techniques provide for a base station to determine a set of non-linearity coefficients for a digital pre-distortion procedure using information provided by multiple user equipments (UEs). For instance, a base station may transmit, to each UE of a set of UEs, one or more respective training parameters for the digital pre-distortion procedure. Each UE may determine one or more respective training values based on the one or more training parameters, where the one or more training parameters support a computation by the base station of a set of non-linearity coefficients for the digital pre-distortion procedure. The base station thus may receive, from some or all UEs of the set of UEs, the one or more respective training values. For example, the training values received by the base station from the UEs may be respective sets of intermediate results or other interim information, rather than the non-linearity coefficients themselves, such that the base station may compute the non-linearity coefficients based on an aggregation of the information from the multiple UEs. The base station may use the non-linearity coefficients to perform the related digital pre-distortion procedure for one or more subsequent downlink transmissions, to one or more UEs within the group of UEs that provided the training values, or to one or more other UEs.

A method for wireless communication at a base station is described. The method may include transmitting, to each user equipment (UE) of a set of UEs, one or more respective training parameters for a digital pre-distortion procedure, receiving (e.g., from each UE of the set of UEs) one or more respective training values based on the one or more respective training parameters, determining a set of non-linearity coefficients based on the one or more respective training values, performing the digital pre-distortion procedure for a downlink transmission, the digital pre-distortion procedure based on the set of non-linearity coefficients, and transmitting, after performing the digital pre-distortion procedure, the downlink transmission.

An apparatus for wireless communication at a base station is described. The apparatus may include a processor, memory coupled with the processor, and instructions stored in the memory. The instructions may be executable by the processor to cause the apparatus to transmit, to each UE of a set of UEs, one or more respective training parameters for a digital pre-distortion procedure, receive (e.g., from each UE of the set of UEs) one or more respective training values based on the one or more respective training parameters, determine a set of non-linearity coefficients based on the one or more respective training values, perform the digital pre-distortion procedure for a downlink transmission, the digital pre-distortion procedure based on the set of non-linearity coefficients, and transmit, after performing the digital pre-distortion procedure, the downlink transmission.

Another apparatus for wireless communication at a base station is described. The apparatus may include means for transmitting, to each UE of a set of UEs, one or more respective training parameters for a digital pre-distortion procedure, means for receiving (e.g., from each UE of the set of UEs) one or more respective training values based on the one or more respective training parameters, means for determining a set of non-linearity coefficients based on the one or more respective training values, means for performing the digital pre-distortion procedure for a downlink transmission, the digital pre-distortion procedure based on the set of non-linearity coefficients, and means for transmitting, after performing the digital pre-distortion procedure, the downlink transmission.

A non-transitory computer-readable medium storing code for wireless communication at a base station is described. The code may include instructions executable by a processor to transmit, to each UE of a set of UEs, one or more respective training parameters for a digital pre-distortion procedure, receive (e.g., from each UE of the set of UEs) one or more respective training values based on the one or more respective training parameters, determine a set of non-linearity coefficients based on the one or more respective training values, perform the digital pre-distortion procedure for a downlink transmission, the digital pre-distortion procedure based on the set of non-linearity coefficients, and transmit, after performing the digital pre-distortion procedure, the downlink transmission.

Some examples of the method, apparatuses, and non-transitory computer-readable medium described herein may further include operations, features, means, or instructions for transmitting respective reference signals to each UE of the set of UEs, where the one or more respective training values may be based on the respective reference signals.

In some examples of the method, apparatuses, and non-transitory computer-readable medium described herein, the one or more respective training values include respective vectors of training values each for a respective UE of the set of UEs and determining the set of non-linearity coefficients may be based on the respective vectors for the set of UEs.

In some examples of the method, apparatuses, and non-transitory computer-readable medium described herein, a conjugate transpose of a kernel matrix, where columns of the kernel matrix respectively correspond to non-linearity kernels and rows of the kernel matrix respectively correspond to equations, each of the equations for a respective portion of a time domain or a frequency domain, a diagonal matrix of weighting factors for the respective UE, and a target vector including target values for the equations, the target values for the respective UE.

In some examples of the method, apparatuses, and non-transitory computer-readable medium described herein, the target vector corresponds to an input to a power amplifier.

In some examples of the method, apparatuses, and non-transitory computer-readable medium described herein, the target vector corresponds to an output from a power amplifier.

Some examples of the method, apparatuses, and non-transitory computer-readable medium described herein may further include operations, features, means, or instructions for identifying a respective matrix for each UE of the set of UEs, where determining the set of non-linearity coefficients may be further based on the respective matrices for the set of UEs.

In some examples of the method, apparatuses, and non-transitory computer-readable medium described herein, the one or more respective training values further include the respective matrix for each UE of the set of UEs.

In some examples of the method, apparatuses, and non-transitory computer-readable medium described herein, a kernel matrix, where columns of the kernel matrix respectively correspond to non-linearity kernels and rows of the kernel matrix respectively correspond to equations, each of the equations for a respective portion of a time domain or a frequency domain, a diagonal matrix of weighting factors for the respective UE, and a conjugate transpose of the kernel matrix.

Some examples of the method, apparatuses, and non-transitory computer-readable medium described herein may further include operations, features, means, or instructions for identifying a respective scalar value for each UE of the set of UEs and determining, for each UE of the set of UEs, a respective first product based on a multiplication of the respective scalar value with the respective vector of training values, where determining the set of non-linearity coefficients may be based on the respective first product for each UE of the set of UEs.

Some examples of the method, apparatuses, and non-transitory computer-readable medium described herein may further include operations, features, means, or instructions for determining, for each UE of the set of UEs, a respective second product based on a multiplication of the respective scalar value with the respective matrix, where determining the set of non-linearity coefficients may be based on the respective second product for each UE of the set of UEs.

Some examples of the method, apparatuses, and non-transitory computer-readable medium described herein may further include operations, features, means, or instructions for aggregating the respective first products for each UE of the set of UEs and aggregating the respective second products for each UE of the set of UEs, where determining the set of non-linearity coefficients may be based on aggregating the respective first products and aggregating the respective second products for each UE of the set of UEs.

In some examples of the method, apparatuses, and non-transitory computer-readable medium described herein, determining the set of non-linearity coefficients may include operations, features, means, or instructions for obtaining an aggregated vector based on aggregating the respective first products, obtaining an aggregated matrix based on aggregating the respective second products, and multiplying an inverse of the aggregated matrix with the aggregated vector, where determining the set of non-linearity coefficients may be based on multiplying the inverse of the aggregated matrix with the aggregated vector.

Some examples of the method, apparatuses, and non-transitory computer-readable medium described herein may further include operations, features, means, or instructions for receiving, from each UE of the set of UEs, a respective indication of a capability to determine the one or more respective training values, where transmitting the one or more respective training parameters to each UE of the set of UEs may be based on receiving the respective indication of the capability from each UE of the set of UEs.

In some examples of the method, apparatuses, and non-transitory computer-readable medium described herein, the one or more respective training parameters include respective diagonal matrices of weighting factors for each UE of the set of UEs, respective bandwidths for which each UE of the set of UEs may be to determine the one or more respective training values, one or more kernels associated with the set of non-linearity coefficients, a sampling rate associated with the set of non-linearity coefficients, or any combination thereof.

In some examples of the method, apparatuses, and non-transitory computer-readable medium described herein, performing the digital pre-distortion procedure may include operations, features, means, or instructions for distorting a signal based on the set of non-linearity coefficients before amplifying the signal, where the downlink transmission may be based on the signal, and where the amplifying may be prior to the transmitting.

In some examples of the method, apparatuses, and non-transitory computer-readable medium described herein, the downlink transmission may be transmitted to a UE of the set of UEs.

In some examples of the method, apparatuses, and non-transitory computer-readable medium described herein, the downlink transmission may be transmitted to a UE excluded from the set of UEs.

A method for wireless communication at a UE is described. The method may include receiving, from a base station, one or more training parameters for a digital pre-distortion procedure associated with the base station, determining one or more training values associated with the digital pre-distortion procedure based on the one or more training parameters, where the one or more training values support a computation of a set of non-linearity coefficients for the digital pre-distortion procedure, and transmitting the one or more training values to the base station.

An apparatus for wireless communication at a UE is described. The apparatus may include a processor, memory coupled with the processor, and instructions stored in the memory. The instructions may be executable by the processor to cause the apparatus to receive, from a base station, one or more training parameters for a digital pre-distortion procedure associated with the base station, determine one or more training values associated with the digital pre-distortion procedure based on the one or more training parameters, where the one or more training values support a computation of a set of non-linearity coefficients for the digital pre-distortion procedure, and transmit the one or more training values to the base station.

Another apparatus for wireless communication at a UE is described. The apparatus may include means for receiving, from a base station, one or more training parameters for a digital pre-distortion procedure associated with the base station, means for determining one or more training values associated with the digital pre-distortion procedure based on the one or more training parameters, where the one or more training values support a computation of a set of non-linearity coefficients for the digital pre-distortion procedure, and means for transmitting the one or more training values to the base station.

A non-transitory computer-readable medium storing code for wireless communication at a UE is described. The code may include instructions executable by a processor to receive, from a base station, one or more training parameters for a digital pre-distortion procedure associated with the base station, determine one or more training values associated with the digital pre-distortion procedure based on the one or more training parameters, where the one or more training values support a computation of a set of non-linearity coefficients for the digital pre-distortion procedure, and transmit the one or more training values to the base station.

Some examples of the method, apparatuses, and non-transitory computer-readable medium described herein may further include operations, features, means, or instructions for receiving a transmission from the base station based on transmitting the one or more training values.

Some examples of the method, apparatuses, and non-transitory computer-readable medium described herein may further include operations, features, means, or instructions for receiving a reference signal from the base station, where the one or more training values may be based on the reference signal.

In some examples of the method, apparatuses, and non-transitory computer-readable medium described herein, the one or more training values include a vector of training values.

In some examples of the method, apparatuses, and non-transitory computer-readable medium described herein, a conjugate transpose of a kernel matrix, where columns of the kernel matrix respectively correspond to non-linearity kernels and rows of the kernel matrix respectively correspond to equations, each of the equations for a respective portion of a time domain or a frequency domain, a diagonal matrix of weighting factors for the UE, and a target vector including target values for the equations, the target values for the UE.

In some examples of the method, apparatuses, and non-transitory computer-readable medium described herein, the target vector corresponds to an input to a power amplifier or an output of the power amplifier.

In some examples of the method, apparatuses, and non-transitory computer-readable medium described herein, the one or more training values further include a matrix of training values.

In some examples of the method, apparatuses, and non-transitory computer-readable medium described herein, a kernel matrix, where columns of the kernel matrix respectively correspond to non-linearity kernels and rows of the kernel matrix respectively correspond to equations, each of the equations for a respective portion of a time domain or a frequency domain, a diagonal matrix of weighting factors for the UE, and a conjugate transpose of the kernel matrix.

Some examples of the method, apparatuses, and non-transitory computer-readable medium described herein may further include operations, features, means, or instructions for transmitting, to the base station, an indication of a capability to determine the one or more training values, where receiving the one or more training may be based on transmitting the indication of the capability.

In some examples of the method, apparatuses, and non-transitory computer-readable medium described herein, the one or more training parameters include a diagonal matrix of weighting factors for the, a bandwidth for determining the one or more training values, one or more kernels associated with the set of non-linearity coefficients, a sampling rate associated with the set of non-linearity coefficients, or any combination thereof.

DETAILED DESCRIPTION

Figure 1:
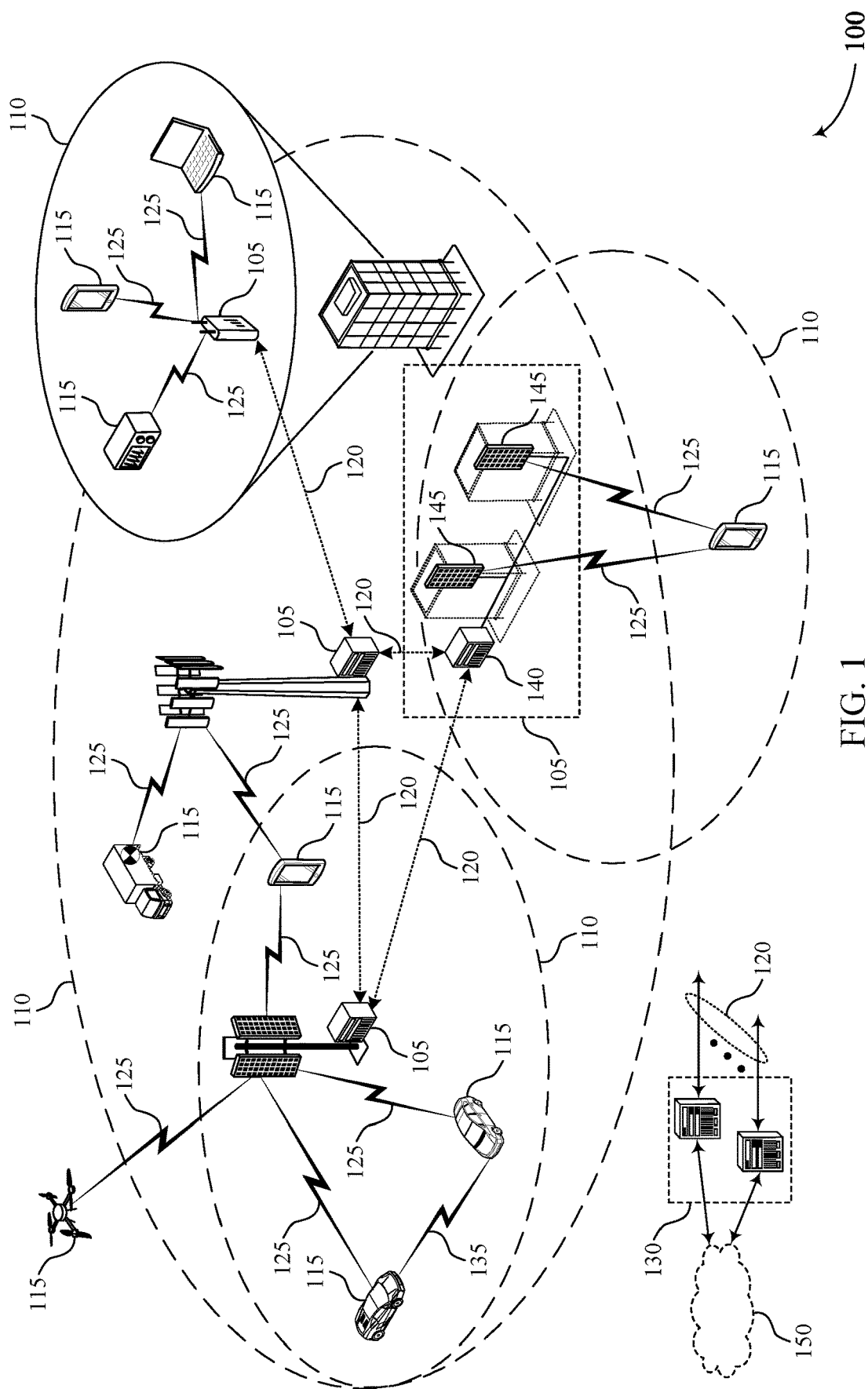
FIG. 1 illustrates an example of a wireless communications system that supports distributed digital pre-distortion training in accordance with aspects of the present disclosure.

In some examples, a base station may perform a digital pre-distortion (DPD) procedure when communicating with another wireless device (e.g., a user equipment (UE)). A DPD procedure may be based on a set of non-linearity coefficients, which may be configured to offset or otherwise mitigate the impact of one or more non-linearities associated with transmission circuitry of the base station. For example, a power amplifier (PA) may have non-linear characteristics and thus, absent DPD, may introduce one or more non-linearities into a transmitted signal. In such an example, performing a DPD procedure may include the base station distorting a signal prior to amplifying of the signal via the PA, where the distortions compensate for non-linearities associated with the PA. The base station may then transmit the amplified signal (or a signal based thereon).

In some examples, to determine the set of non-linearity coefficients to use for a DPD procedure, a base station may perform a DPD training procedure with a single UE. For instance, the base station may transmit an indication of one or more training parameters to the UE along with a reference signal, the UE may compute or otherwise determine the non-linearity coefficients based on the reference signal and the one or more training parameters, and the UE may then transmit an indication of the set of non-linearity coefficients to the base station. Such a single-UE approach may, however, have one or more drawbacks. For example, there may be examples in which the UE has a limited computation capability. Additionally or alternatively, as another example, there may be examples in which a UE is configured to communicate over a relatively limited bandwidth, and non-linearity coefficients determined and provided by the UE may be relatively inaccurate for other frequencies that the base station may use to communicate with one or more other UEs.

In other examples, however, as described herein, a base station may perform DPD training using multiple UEs. For instance, the base station may transmit one or more respective training parameters to each UE of a group of training UEs (e.g., different training parameters to different UEs) along with one or more reference signals to the different training UEs. Each training UE may compute or otherwise determine one or more respective training values based on the respective training parameters for the training UE and the one or more reference signals, and each training UE may transmit its one or more respective training values to the base station. For example, the training values received by the base station from the UEs may be respective sets of intermediate results or other interim information, rather than the non-linearity coefficients themselves, such that the base station may itself compute the non-linearity coefficients based on an aggregation of the information (e.g., training values) from the multiple UEs.

Thus, each training UE of the multiple training UEs may perform relatively fewer or less computationally intense computations compared to a single UE calculating the set of non-linearity coefficients. Accordingly, the DPD training procedure may be associated with a lower latency when multiple UEs calculate one or more training values as compared to a single UE calculating the set of non-linearity coefficients. Additionally or alternatively, the training UEs may collectively operate over a wider bandwidth (e.g., at least one of the multiple UEs may have a bandwidth that is at least partially non-overlapping in frequency with another of the multiple UEs). Accordingly, the multiple UEs may be associated with a greater bandwidth than a single UE, and thus the set of non-linearity coefficients determined by the base station based on an aggregation of information from across the multiple training UEs may be applicable to a wider bandwidth, to a greater quantity of UEs, or both (e.g., relative to a single-UE approach to DPD training). Additionally or alternatively, receiving feedback from multiple training UEs may reduce the impact of noise on the DPD training. For instance, even if signals sent to the multiple training UEs are impacted by noise, thus impacting the one or more training values provided to a base station by each individual training UE, aggregating (e.g., averaging) the information received from the multiple training UEs may suppress the impact of such noise. These and other benefits described herein are merely exemplary, and one of ordinary skill in the art may appreciate additional or alternative benefits of the teachings herein.

Aspects of the disclosure are initially described in the context of wireless communications systems. Additional aspects of the disclosure are described in the context of an additional wireless communications system, feedback models, and a process flow. Aspects of the disclosure are further illustrated by and described with reference to apparatus diagrams, system diagrams, and flowcharts that relate to distributed digital pre-distortion training.

FIG. 1 illustrates an example of a wireless communications system 100 that supports distributed digital pre-distortion training in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via a core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the base station 105 may perform DPD training using multiple UEs 115. For instance, the base station 105 may transmit one or more respective training parameters to each UE 115 of the multiple UEs 115, along with respective reference signals or a common reference signal, and each of the multiple UEs 115 may subsequently transmit to the base station 105 one or more respective training values based on the one or more respective training parameters for the UE 115 and one or more reference signals. Using the one or more respective training parameters, the base station 105 may determine the set of non-linearity coefficients for a DPD procedure and subsequently apply the DPD procedure to one or more transmissions (e.g., downlink transmissions).

Each UE 115 of the multiple UEs 115 may perform fewer computations than would a single UE 115 calculating the set of non-linearity coefficients. Accordingly, the DPD training procedure may be associated with a lower latency when multiple UEs 115 calculate one or more training values as compared to a single UE 115 calculating the set of non-linearity coefficients. Additionally, at least one of the multiple UEs 115 may have a bandwidth that is at least partially non-overlapping in frequency with another of the multiple UEs 115. Accordingly, the multiple UEs 115 may collectively be associated with a greater bandwidth than a single UE 115. These and other benefits of the teachings herein may be appreciated by one of ordinary skill the art.

Figure 2:
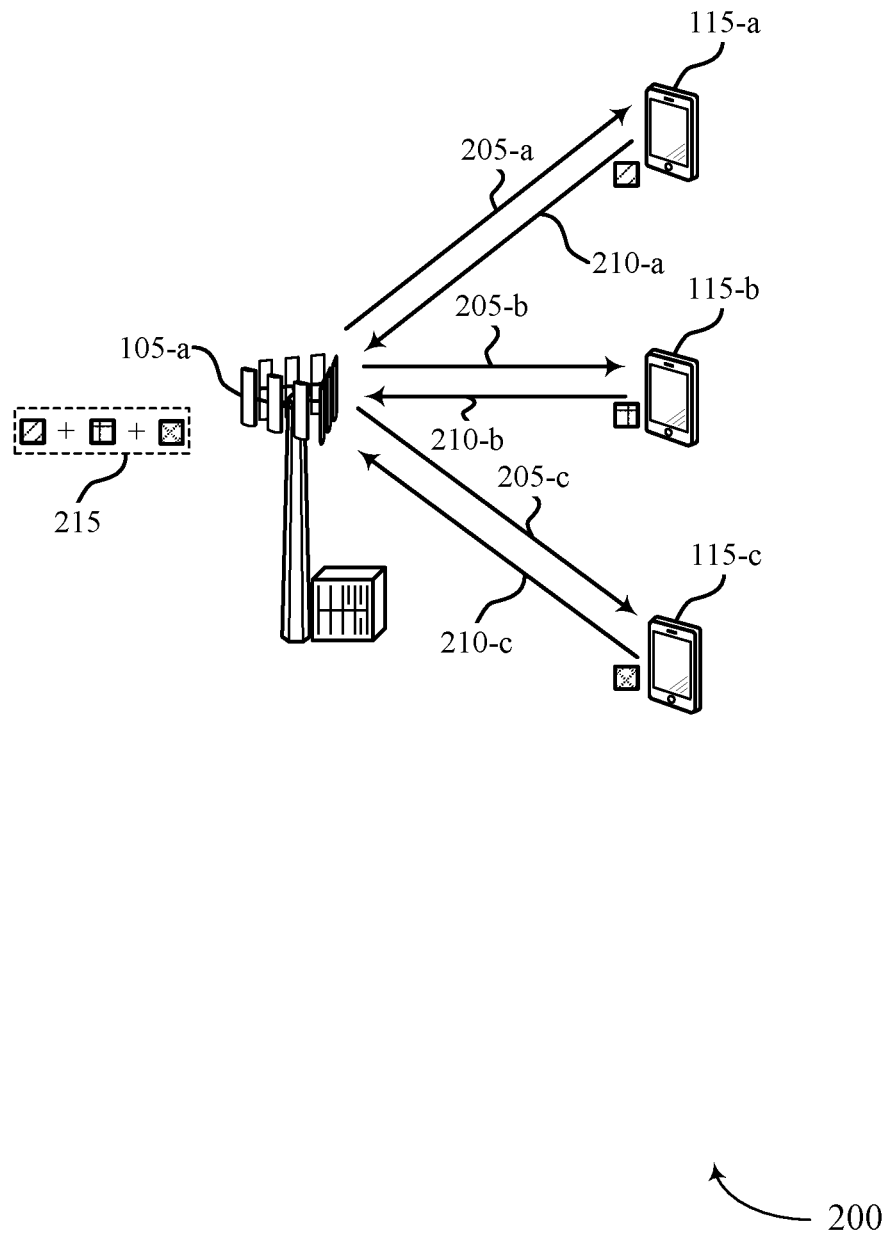
FIG. 2 illustrates an example of a wireless communications system that supports distributed digital pre-distortion training in accordance with aspects of the present disclosure.

FIG. 2 illustrates an example of a wireless communications system 200 that supports distributed digital pre-distortion training in accordance with aspects of the present disclosure. In some examples, wireless communications system 200 may be implemented by one or more aspects of wireless communications system 100. For instance, base station 105-a may be an example of a base station 105 as described with reference to FIG. 1 and UEs 115-a, 115-b, and 115-c may be examples of UEs 115 as described with reference to FIG. 1.

In some examples, base station 105-a may communicate with another wireless device (e.g., a UE 115). However, when performing communications, if a transmitter chain of base station 105-a includes non-linear (NL) components, such as a power amplifier (PA), a signal transmitted by base station 105-a may be distorted above a threshold amount. To mitigate (e.g., avoid, reduce) these distortions, base station 105-a may introduce power back-off (BO) when operating a PA, as one example. However, using power BO may decrease PA power efficiency, may reduce a rate-over-range (e.g., an achievable throughput at a specific path loss or distance from base station 105-a), may reduce a coverage area, or any combination thereof.

In some cases, to reduce non-linearities in transmitted signals, base station 105-a may perform over the air DPD (OTA-DPD) to communicate with another wireless device (e.g., a UE 115). For example, base station 105-a may perform DPD in a digital front end of a transmitter of base station 105-a, which may reduce a level of BO used for a given distortion target, and which thus may improve PA power efficiency, rate-over-range, coverage area, or any combination thereof.

In some examples, determining a set of non-linearities coefficients for use in a DPD procedure may include coupling a transmitter output to a receiver feedback chain to capture non-linearity and estimate it. However, in examples where base station 105-a uses transmit antenna arrays with a number of antennas above a threshold amount, one or more drawbacks (e.g., increased cost of a feedback link per PA) may be present. Additionally or alternatively, transmitter coupling feedback may capture distortions per individual PA and may be incapable of capturing distortions on a far field beam. Accordingly, base station 105-a may be incapable of accounting for non-linearities associated with cross-coupling between different transmit chains (e.g., signals amplified by different Pas).

In some examples, base station 105-a may perform training in support of OTA-DPD with the aid of a single UE 115. For instance, a UE 115 communicating with base station 105-a may calculate a set of non-linearity coefficients (e.g., non-linearity coefficients for a PA or other component of base station 105-a) based on a reference signal and related training parameters, and the UE 115 may signal the set of non-linearity coefficients to base station 105-a. Base station 105-a may configure DPD functionality at base station 105-a based on this feedback.

In one example, base station 105-a may receive a UE DPD training capability from a UE 115. Base station 105-a may transmit one or more training parameters (e.g., via a control message) to the UE 115 based on receiving the UE DPD training capability. Base station 105-a may transmit one or more reference signals (e.g., a non-linear reference signal (NLRS)) to the UE 115. Using the one or more training parameters and the one or more reference signals, the UE 115 may determine the set of non-linearity coefficients and may indicate the non-linearity coefficients to base station 105-a. In some examples, the set of non-linearity coefficients may be referred to as PA non-linearity coefficients or more generally DPD coefficients, as they may in some cases be applicable to one or more other components of the base station, in additional or in the alterative to a PA.

However, performing the DPD training on a single UE 115 may decrease an amount of time that the single UE 115 has available to perform other operations. As described herein, base station 105-$a$ may perform DPD training using multiple UEs 115 (e.g., UEs 115-$a$, 115-$b$, and 115-$c$). For instance, base station 105-$a$ may transmit an indication 205-$a$ of one or more first training parameters to UE 115-$a$, an indication 205-$b$ of one or more second training parameters to UE 115-$b$, and an indication 205-$c$ of one or more third training parameters to UE 115-$c$. UEs 115-$a$, 115-$b$, and 115-$c$ may determine one or more first training values, one or more second training values, and one or more third training values, respectively, based on the one or more first training parameters, the one or more second training parameters, and the one or more third training parameters, respectively. UE 115-$a$ may transmit an indication 210-$a$ of the one or more first training values to base station 105-$a$, UE 115-$b$ may transmit an indication 210-$b$ of the one or more second training values to base station 105-$a$, and UE 115-$c$ may transmit an indication 210-$c$ of the one or more third training values to base station 105-$a$. In some examples, the one or more first training values, the one or more second training values, and the one or more third training values may be referred to as intermediate results. In some examples, a DPD training procedure where a base station 105 communicates with multiple UEs 115 may be referred to as federated learning.

Base station 105-$a$ may aggregate the intermediate results and may calculate a set of non-linearity coefficients (e.g., final DPD coefficients) that it is to apply. Performing training in this manner may enable base station 105-$a$ to obtain processing gain by average an NL model from multiple UEs 115. Additionally or alternatively, performing training in this manner may enable aggregation of results from multiple UEs 115, where each UE 115 calculates a subset of data. Such aggregation may be advantageous when UEs 115-$a$, 115-$b$, and 115-$c$ have a limited computation capacity and/or a limited bandwidth allocated to each of UEs 115-$a$, 115-$b$, and 115-$c$.

In some examples, to determine the set of non-linearity coefficients, g, base station 105-$a$ may determine $\arg\min_g \|w(Ag-y)\|^2$, where g may be a non-linearity coefficients vector to be calculated (e.g., PA NL coefficients or DPD coefficients), A may be a matrix whose columns represent non-linear kernels and whose rows each represent one equation (e.g., a time domain sample or a frequency domain bin), y may be a target vector whose elements each represent a target per equation (e.g., a time domain sample of frequency domain bin target), and w may be a weight diagonal matrix. The weight diagonal matrix may be configured to manage (e.g., optimize) performance of different frequency regions. For instance, the weight diagonal matrix may be configured to manage (e.g., optimize) in-band distortions (e.g., distortions related to error vector magnitude (EVM) or out of band distortions (e.g., adjacent channel leakage ratio (ACLR). Additionally or alternatively, the weight diagonal matrix may represent a weight per UE 115 when the set of equations is aggregated from multiple UEs 115 and/or the multiple UEs 115 experience different SNRs.

For the methods described herein, each of UEs 115-$a$, 115-$b$, and 115-$c$ may provide results for a subset of the equations (e.g., based on a subset of A, y, and w). For instance, $$\arg\min_g \|w(Ag-y)\|^2 = \arg\min_g \left\| \begin{bmatrix} w_0 & \cdots & \\ \vdots & \ddots & \vdots \\ & \cdots & w_{N-1} \end{bmatrix} \left( \begin{bmatrix} A_0 \\ \vdots \\ A_{N-1} \end{bmatrix} g - \begin{bmatrix} y_0 \\ \vdots \\ y_{N-1} \end{bmatrix} \right) \right\|^2,$$

where an nth UE 115 may generate its subset of equations based on $w_n$, $A_n$, and $y_n$. In some examples, base station 105-$a$ may determine the set of non-linearity coefficients g as $g=(\Sigma_n A_n^H w_n A_n)^{-1} (\Sigma_n A_n^H w_n y_n))$. Accordingly, each UE 115 may signal one or more of $B_n = A_n^H w_n A_n$ and $z_n = A_n^H w_n y_n$ in the one or more training values.

Once base station 105-$a$ receives the one or more training values from multiple UEs 115 (e.g., some or all of the UEs 115), base station 105-$a$ may calculate g as $g=(\Sigma_n v_n B_n)^{-1} (\Sigma_n v_n z_n)$, where $v_n$ may be a scalar per UE 115 that represents a quality metric that base station 105-$a$ is to apply on each UE 115 to normalize a size of the subset of data that a UE 115 has used or to represent different SNRs for different UEs.

Performing the methods described herein may be associated with one or more advantages. For instance, the methods described herein may use reduced signaling (e.g., minimal signaling) compared to methods where a single UE 115 generates the set of non-linearity coefficients (e.g., if a number of DPD coefficients is below a threshold amount, one or both of $B_n$ and $z_n$ may be of a respective size below a corresponding threshold amount). Additionally, the training described herein may be managed (e.g., optimized) based on the specifications of the training parameters transmitted by base station 105-$a$. In some examples, the training parameters (e.g., $(TP_n)$) signaled to an nth UE 115 may include a bandwidth to estimate on, a weight matrix (e.g., $w_n$) used to prioritize in-band frequencies or out of band frequency, and coefficients (e.g., kernels) to be used for an estimation.

Figure 3A:
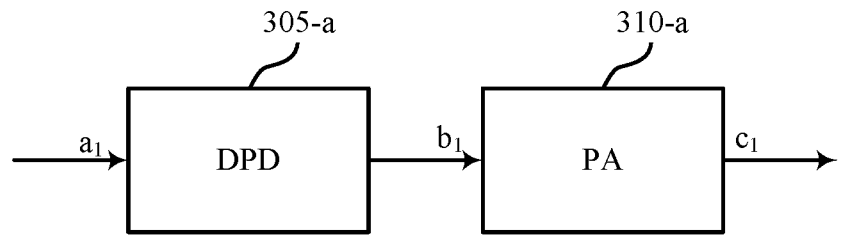
FIGS. 3A and 3B illustrates examples of feedback models that support distributed digital pre-distortion training in accordance with aspects of the present disclosure.
Figure 3B:
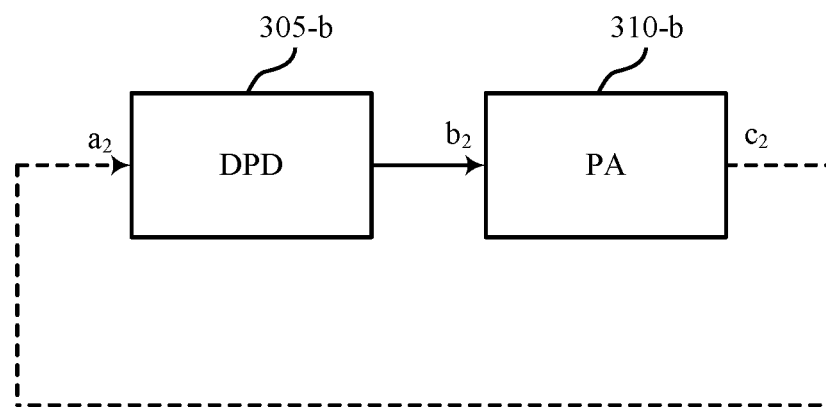

FIGS. 3A and 3B illustrate examples of feedback models 300-$a$ and 300-$b$ that support distributed digital pre-distortion training in accordance with aspects of the present disclosure. In some examples, feedback models 300-$a$ and 300-$b$ may be implemented by one or more aspects of FIG. 1. For instance, DPD component 305-$a$ and PA 310-$a$ and/or DPD component 305-$b$ and PA 310-$b$ may be examples of one or more components of a base station 105 as described with reference to FIG. 1. Though aspects of the methods as described with regards to FIGS. 3A and 3B may be exampled with reference to a single UE 115, it is to be understood that this is merely for clarity of explanation, and one or ordinary skill in the art will appreciate that these techniques may be extended to federated learning with multiple UEs 115 in accordance with other aspects of the teachings herein.

FIG. 3A may demonstrate a first method of a training procedure in which a base station 105 estimates a PA model. In some such examples, the base station 105 may identify an input to the PA (e.g., vector b) as a training sequence and may use b to create $A_n$. Accordingly, the base station 105 and the UEs 115 performing the training procedure may identify $A_n$. In some such examples, the UEs 115 may refrain from including $B_n$ in the one or more training values signaled to the base station 105. In some examples, the UEs 115 performing the training procedure may estimate the output of the PA 310-$a$ (e.g., vector c, which may correspond to vector y as described with reference to FIG. 2). The UEs may use the vector c to determine $z_n$ (e.g., according to $z_n = A_n^H w_n c_n$ and may include $z_n$ in the one or more training values signaled to the base station 105.

FIG. 3B may demonstrate a second method of a training procedure in which a base station 105 estimates a DPD model. In FIG. 3B, an output of PA 310-$b$ may be coupled with an input of DPD component 305-$b$. In some such examples, UEs 115 performing a training procedure with base station 105-$a$ may estimate the output of the PA 310-$b$ (e.g., vector c). From vector c, the UEs 115 may generate $A_n$, may calculate $B_n$, and may signal $B_n$ to the base station 105 via the one or more training values. In the present example, the UEs 115 and the base station 105 may identify the PA 310-b input and/or the DPD component 305-b output (e.g., vector b, which may correspond to vector y as described with reference to FIG. 2). Accordingly, the UEs may calculate $z_n = A_n^H w_n b_n$ and may signal $z_n$ to the base station 105.

Figure 4:
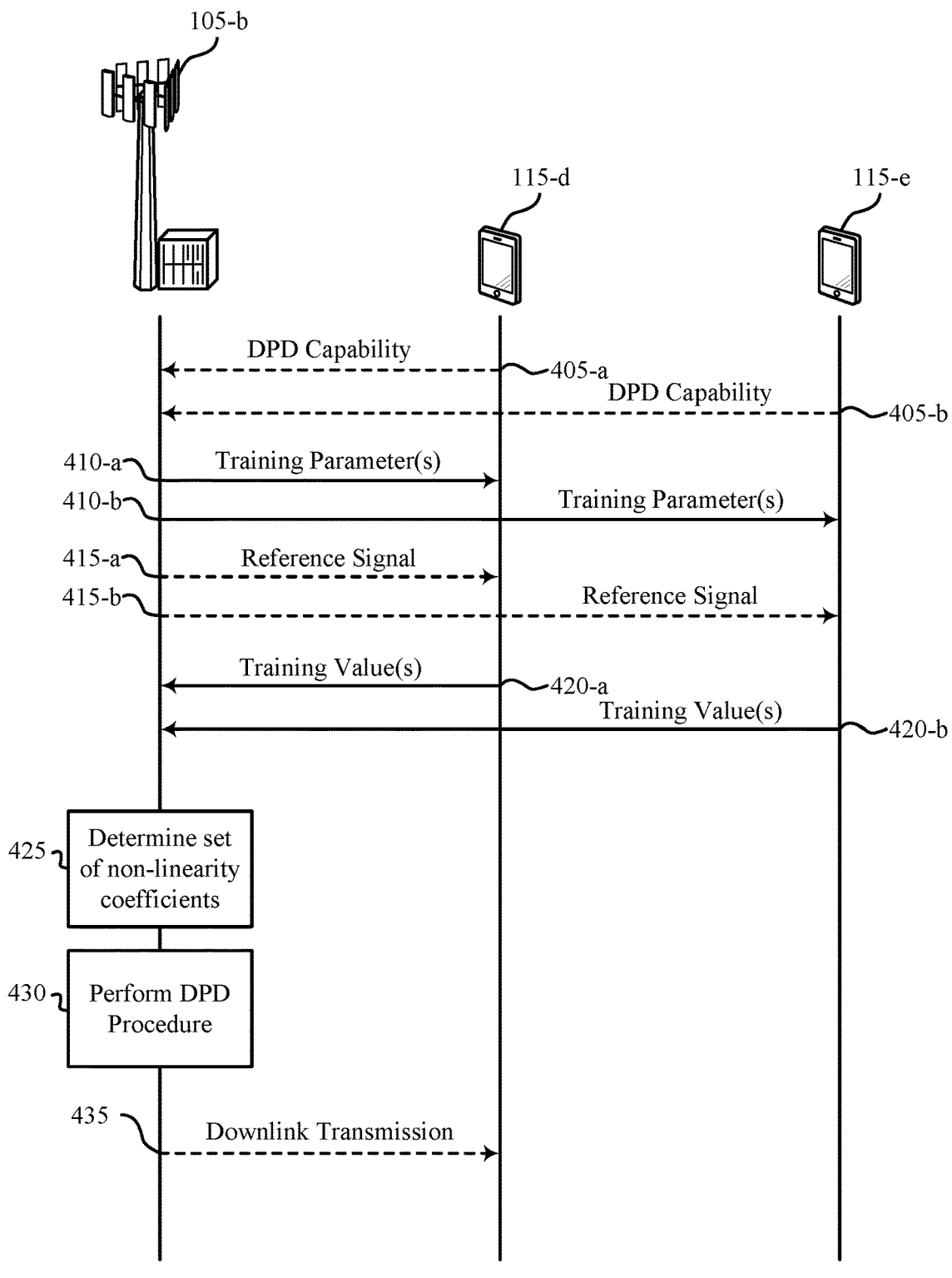
FIG. 4 illustrates an example of a process flow that supports distributed digital pre-distortion training in accordance with aspects of the present disclosure.

FIG. 4 illustrates an example of a process flow 400 that supports distributed digital pre-distortion training in accordance with aspects of the present disclosure. In some examples, process flow 400 may be implemented by one or more aspects of wireless communications system 100. For instance, UEs 115-d and 115-e may be examples of UEs 115 as described with reference to FIG. 1 and base station 105-b may be an example of a base station 105 as described with reference to FIG. 1. In some examples, UEs 115-e and 115-d may be included in a set of UEs 115. Although two UEs 115 are contemplated in the present example, the methods as described herein may be applied to three or more UEs 115.

At 405-a, base station 105-b may receive, from UE 115-d, a first indication of a capability to determine one or more first training values. At 405-b base station 105-b may receive, from UE 115-e, a second indication of a capability to determine one or more second training values.

At 410-a, base station 105-b may transmit, to UE 115-d, one or more first training parameters (e.g., one or more of $w_d$, $y_d$, $A_d$, and a first bandwidth, where $0 \leq d \leq N-1$) for a DPD procedure. At 410-b, base station 105-b may transmit, to UE 115-e, one or more second training parameters (e.g., one or more of $w_e$, $y_e$, $A_e$, and a second bandwidth, where $0 \leq e \leq N-1$ and $d \neq e$) for a DPD procedure. In some examples, transmitting the one or more first training parameters may be based on receiving the first indication of the capability and transmitting the one or more second training parameters may be based on receiving the second indication of the capability. In some examples, each of the one or more first training parameters and the one or more second training parameters may include respective diagonal matrices of weighting factors (e.g., $w_d$ and $w_e$, respectively), respective bandwidths for each of UEs 115-d and 115-e to determine one or more respective training values, one or more kernels associated with a set of non-linearity coefficients (e.g., g), a sampling rate associated with the set of non-linearity coefficients, or any combination thereof.

At 415-a, base station 105-b may transmit a first reference signal to UE 115-d. At 415-b, base station 105-b may transmit a second reference signal to UE 115-e.

In some examples, UE 115-d may determine one or more first training values based on the one or more first training parameters and UE 115-e may determine one or more second training values based on the one or more second training parameters. The one or more training values may support a computation of a set of non-linearity coefficients for the DPD procedure.

At 420-a, base station 105-b may receive, from UE 115-d, the one or more first training values based on the one or more first training parameters. At 420-b, base station 105-b may receive, from UE 115-e, the one or more second training values based on the one or more second training parameters. In some examples, the one or more first training values may be based on the first reference signal and the one or more second training values may be based on the second reference signal.

In some examples, the one or more first training values may include a first vector of training values (e.g., $z_d$) and the one or more second training values may include a second vector of training values (e.g., $z_e$). In some examples, each of the first vector and the second vector may be based on a conjugate transpose of a kernel matrix (e.g., $A_d^H$ and $A_e^H$, respectively), where columns of the kernel matrix may respectively correspond to non-linearity kernels and rows of the kernel matrix may respectively correspond to equations, where each of the equations may be for a respective portion of a time domain or a frequency domain. In some examples, each of the first vector and the second vector may be based on a diagonal matrix of weighting factors (e.g., $w_d$ and $w_e$, respectively) and/or a target vector including target values for the equations (e.g., $y_d$ and $y_e$, respectively). In some examples, the target vector corresponds to an input of a power amplifier (e.g., a power amplifier of base station 105-b). In other examples, the target vector corresponds to an output of a power amplifier (e.g., a power amplifier of base station 105-b).

At 425, base station 105-b may determine a set of non-linearity coefficients (e.g., g) based on the one or more first training values and the one or more second training values. In some examples, base station 105-b may determine the set of non-linearity coefficients based on the first vector of training values and the second vector of training values). In some examples, base station 105-b may calculate a first matrix for UE 115-d (e.g., $B_d$) and a second matrix for UE 115-e (e.g., $B_e$). Alternatively, UE 115-d may calculate the first matrix and may include the first matrix in the one or more first training values and/or UE 115-e may calculate the second matrix and may include the second matrix in the one or more second training values. In some examples, determining the set of non-linearity coefficients may be based on first matrix and the second matrix. In some examples, each of the first matrix and the second matrix may be based on a kernel matrix (e.g., $A_d$ and $A_e$, respectively), where columns of the kernel matrix respectively correspond to non-linearity kernels and rows of the kernel matrix correspond to equations, each of the equations for a respective portion of a time domain or a frequency domain. In some examples each of the first matrix and the second matrix may be based on a diagonal matrix of weighting factors (e.g., $w_1$ and $w_2$, respectively) or a conjugate transpose of the kernel matrix (e.g., $A_d^H$ and $A_e^H$, respectively).

In some examples, base station 105-b may determine a first scalar value for UE 115-d (e.g., $v_d$) and a second scalar value for UE 115-e (e.g., $v_e$). In some such examples, base station 105-b may determine, for each of UE 115-d and 115-e, a respective first product based on a multiplication of the respective scalar value with the respective vector of training values (e.g., $v_d z_d$ and $v_e z_e$, respectively), where determining the set of non-linearity coefficients is based on the respective first product for each of UEs 115-d and 115-e. In some examples, base station 105-b may determine, for each of UEs 115-d and 115-e, a respective second product based on a multiplication of the respective scalar value with the respective matrix (e.g., $v_d B_d$ and $v_e B_e$, respectively), where determining the set of non-linearity coefficients is based on the respective second product for each of UEs 115-d and 115-e.

In some examples, base station 105-b may aggregate the respective first products for each of UEs 115-d and 115-e (e.g., $v_d z_d + v_e z_e$) and may aggregate the respective second products for each of UEs 115-d and 115-e (e.g., $v_d B_d + v_e B_e$), where determining the set of non-linearity coefficients is based on aggregating the respective first product and aggregating the respective second product. In some examples, base station 105-b may obtain an aggregated vector based on aggregating the respective first products (e.g., $v_d z_d + v_e z_e$)

and may obtain an aggregated matrix based on aggregating the respective second products (e.g., $v_d B_d + v_e B_e$). In some such examples, base station 105-b may multiply an inverse of the aggregated matrix with the aggregated vector, where determining the set of non-linearity coefficients is based on multiplying the inverse of the aggregated matrix with the aggregated vector (e.g., $g=(v_d z_d + v_e z_e)(v_d B_d + v_e B_e)^{-1}$.

At 430, base station 105-b may perform the DPD procedure for a downlink transmission, where the DPD procedure is based on the set of non-linearity coefficients. In some examples, performing the DPD procedure includes base station 105-b distorting a signal based on the set of non-linearity coefficients before amplifying the signal.

At 435, base station 105-b may transmit, after performing the DPD procedure, the downlink transmission. In some examples, base station 105-b may transmit the downlink transmission to UE 115-d. In other examples, base station 105-b may transmit the downlink transmission to another UE 115 (e.g., a UE that did not receive training parameters from base station 105-b and/or did not transmit training values to base station 105-b). In some examples, the downlink transmission is based on the signal and the amplifying is prior to the transmitting.

Figure 5:
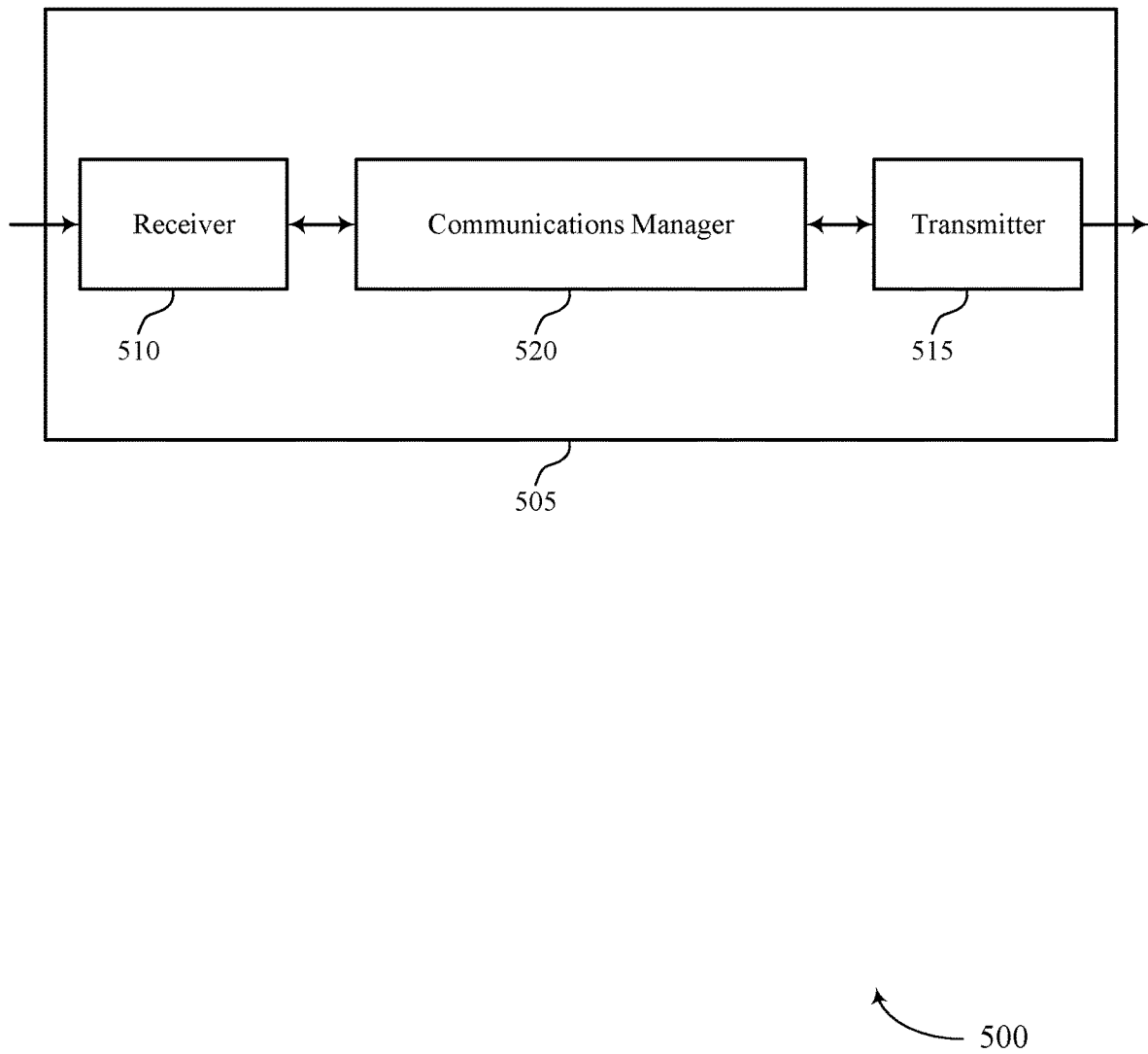
FIGS. 5 and 6 show block diagrams of devices that support distributed digital pre-distortion training in accordance with aspects of the present disclosure.

FIG. 5 shows a block diagram 500 of a device 505 that supports distributed digital pre-distortion training in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to distributed digital pre-distortion training). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to distributed digital pre-distortion training). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of distributed digital pre-distortion training as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a base station in accordance with examples as disclosed herein. For example, the communications manager 520 may be configured as or otherwise support a means for transmitting, to each UE of a set of UEs, one or more respective training parameters for a digital pre-distortion procedure. The communications manager 520 may be configured as or otherwise support a means for receiving (e.g., from each UE of the set of UEs) one or more respective training values based on the one or more respective training parameters. The communications manager 520 may be configured as or otherwise support a means for determining a set of non-linearity coefficients based on the respective training values. The communications manager 520 may be configured as or otherwise support a means for performing the digital pre-distortion procedure for a downlink transmission, the digital pre-distortion procedure based on the set of non-linearity coefficients. The communications manager 520 may be configured as or otherwise support a means for transmitting, after performing the digital pre-distortion procedure, the downlink transmission.

Figure 6:
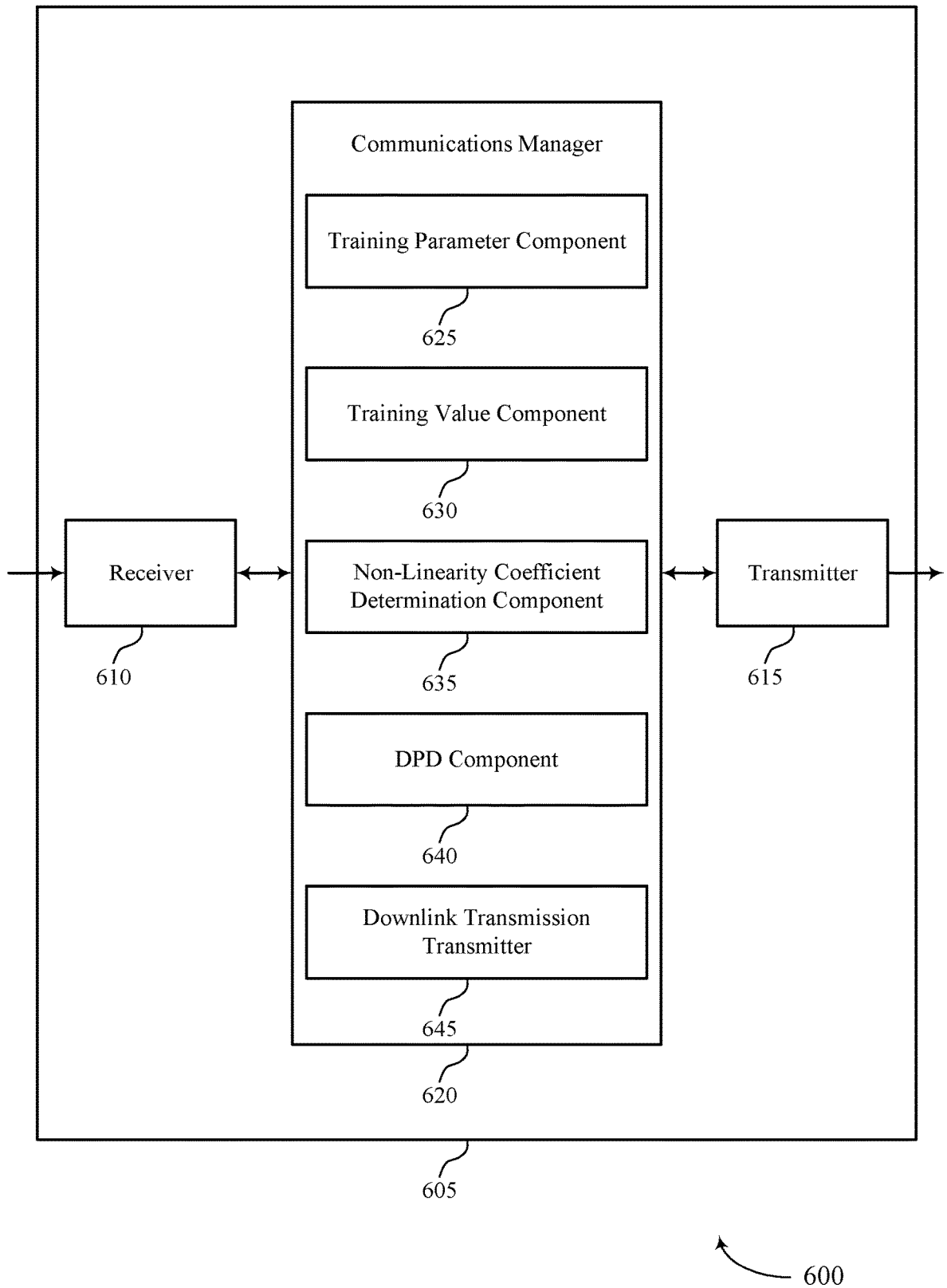

By including or configuring the communications manager 520 in accordance with examples as described herein, the device 505 (e.g., a processor controlling or otherwise coupled to the receiver 510, the transmitter 515, the communications manager 520, or a combination thereof) may support techniques for the device 505 to enable the set of non-linearity coefficients to be determined using a wider bandwidth, to enable each UE of the set of UEs to perform fewer computations than a single UE calculating the set of non-linearity coefficients, or both. Accordingly, the techniques described herein may increase the efficiency of communications.

perform fewer computations than a single UE 115 calculating the set of non-linearity coefficients. Accordingly, the DPD training procedure may be associated with a lower latency when multiple UEs 115 calculate one or more training values as compared to a single UE 115 calculating the set of non-linearity coefficients. Additionally, at least one of the multiple UEs 115 may have a bandwidth that is at least partially non-overlapping in frequency with another of the multiple UEs 115. Accordingly, the multiple UEs 115 may be associated with a greater bandwidth than a single UE 115. For at least these reasons, the methods as described herein may mitigate the one or more drawbacks of limited computation capability and/or limited bandwidth FIG. 6 shows a block diagram 600 of a device 605 that supports distributed digital pre-distortion training in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to distributed digital pre-distortion training). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to distributed digital pre-distortion training). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of distributed digital pre-distortion training as described herein. For example, the communications manager 620 may include a training parameter component 625, a training value component 630, a non-linearity coefficient determination component 635, a DPD component 640, a downlink transmission transmitter 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a base station in accordance with examples as disclosed herein. The training parameter component 625 may be configured as or otherwise support a means for transmitting, to each UE of a set of UEs, one or more respective training parameters for a digital pre-distortion procedure. The training value component 630 may be configured as or otherwise support a means for receiving (e.g., from each UE of the set of UEs) one or more respective training values based on the one or more respective training parameters. The non-linearity coefficient determination component 635 may be configured as or otherwise support a means for determining a set of non-linearity coefficients based on the respective training values. The DPD component 640 may be configured as or otherwise support a means for performing the digital pre-distortion procedure for a downlink transmission, the digital pre-distortion procedure based on the set of non-linearity coefficients. The downlink transmission transmitter 645 may be configured as or otherwise support a means for transmitting, after performing the digital pre-distortion procedure, the downlink transmission.

Figure 7:
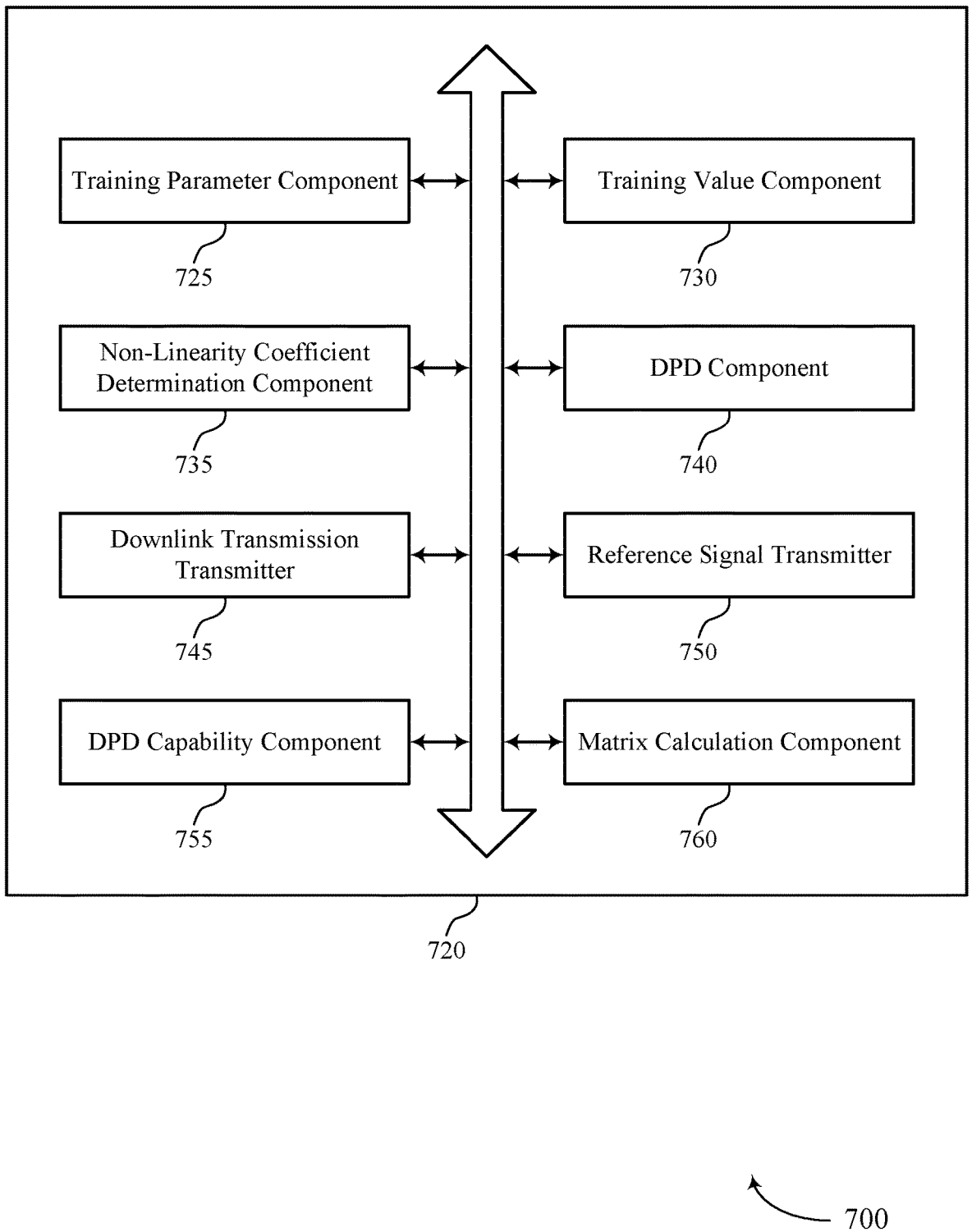
FIG. 7 shows a block diagram of a communications manager that supports distributed digital pre-distortion training in accordance with aspects of the present disclosure.

FIG. 7 shows a block diagram 700 of a communications manager 720 that supports distributed digital pre-distortion training in accordance with aspects of the present disclosure. The communications manager 720 may be an example of aspects of a communications manager 520, a communications manager 620, or both, as described herein. The communications manager 720, or various components thereof, may be an example of means for performing various aspects of distributed digital pre-distortion training as described herein. For example, the communications manager 720 may include a training parameter component 725, a training value component 730, a non-linearity coefficient determination component 735, a DPD component 740, a downlink transmission transmitter 745, a reference signal transmitter 750, a DPD capability component 755, a matrix calculation component 760, or any combination thereof. Each of these components may communicate, directly or indirectly, with one another (e.g., via one or more buses).

The communications manager 720 may support wireless communication at a base station in accordance with examples as disclosed herein. The training parameter component 725 may be configured as or otherwise support a means for transmitting, to each UE of a set of UEs, one or more respective training parameters for a digital pre-distortion procedure. The training value component 730 may be configured as or otherwise support a means for receiving (e.g., from each UE of the set of UEs) one or more respective training values based on the one or more respective training parameters. The non-linearity coefficient determination component 735 may be configured as or otherwise support a means for determining a set of non-linearity coefficients based on the respective training values. The DPD component 740 may be configured as or otherwise support a means for performing the digital pre-distortion procedure for a downlink transmission, the digital pre-distortion procedure based on the set of non-linearity coefficients. The downlink transmission transmitter 745 may be configured as or otherwise support a means for transmitting, after performing the digital pre-distortion procedure, the downlink transmission.

In some examples, the reference signal transmitter 750 may be configured as or otherwise support a means for transmitting respective reference signals to each UE of the set of UEs, where the one or more respective training values are based on the respective reference signals.

In some examples, the one or more respective training values include respective vectors of training values each for a respective UE of the set of UEs. In some examples, determining the set of non-linearity coefficients is based on the respective vectors for the set of UEs.

In some examples, a conjugate transpose of a kernel matrix, where columns of the kernel matrix respectively correspond to non-linearity kernels and rows of the kernel matrix respectively correspond to equations, each of the equations for a respective portion of a time domain or a frequency domain. In some examples, a diagonal matrix of weighting factors for the respective UE. In some examples, a target vector including target values for the equations, the target values for the respective UE.

In some examples, the target vector corresponds to an input to a power amplifier.

In some examples, the target vector corresponds to an output from a power amplifier.

In some examples, the matrix identification component 760 may be configured as or otherwise support a means for identifying (e.g., calculating) a respective matrix for each UE of the set of UEs, where determining the set of non-linearity coefficients is further based on the respective matrices for the set of UEs.

In some examples, the one or more respective training values further include the respective matrix for each UE of the set of UEs.

In some examples, a kernel matrix, where columns of the kernel matrix respectively correspond to non-linearity kernels and rows of the kernel matrix respectively correspond to equations, each of the equations for a respective portion of a time domain or a frequency domain. In some examples, a diagonal matrix of weighting factors for the respective UE. In some examples, a conjugate transpose of the kernel matrix.

In some examples, the non-linearity coefficient determination component 735 may be configured as or otherwise support a means for identifying a respective scalar value for each UE of the set of UEs. In some examples, the non-linearity coefficient determination component 735 may be configured as or otherwise support a means for determining, for each UE of the set of UEs, a respective first product based on a multiplication of the respective scalar value with the respective vector of training values, where determining the set of non-linearity coefficients is based on the respective first product for each UE of the set of UEs.

In some examples, the non-linearity coefficient determination component 735 may be configured as or otherwise support a means for determining, for each UE of the set of UEs, a respective second product based on a multiplication of the respective scalar value with the respective matrix, where determining the set of non-linearity coefficients is based on the respective second product for each UE of the set of UEs.

In some examples, the non-linearity coefficient determination component 735 may be configured as or otherwise support a means for aggregating the respective first products for each UE of the set of UEs. In some examples, the non-linearity coefficient determination component 735 may be configured as or otherwise support a means for aggregating the respective second products for each UE of the set of UEs, where determining the set of non-linearity coefficients is based on aggregating the respective first product and aggregating the respective second product for each UE of the set of UEs.

In some examples, to support determining the set of non-linearity coefficients, the non-linearity coefficient determination component 735 may be configured as or otherwise support a means for obtaining an aggregated vector based on aggregating the respective first products. In some examples, to support determining the set of non-linearity coefficients, the non-linearity coefficient determination component 735 may be configured as or otherwise support a means for obtaining an aggregated matrix based on aggregating the respective second products. In some examples, to support determining the set of non-linearity coefficients, the non-linearity coefficient determination component 735 may be configured as or otherwise support a means for multiplying an inverse of the aggregated matrix with the aggregated vector, where determining the set of non-linearity coefficients is based on multiplying the inverse of the aggregated matrix with the aggregated vector.

In some examples, the DPD capability component 755 may be configured as or otherwise support a means for receiving, from each UE of the set of UEs, a respective indication of a capability to determine the one or more respective training values, where transmitting the one or more respective training parameters to each UE of the set of UEs is based on receiving the respective indication of the capability from each UE of the set of UEs.

In some examples, the one or more respective training parameters include respective diagonal matrices of weighting factors for each UE of the set of UEs, respective bandwidths for which each UE of the set of UEs is to determine the one or more respective training values, one or more kernels associated with the set of non-linearity coefficients, a sampling rate associated with the set of non-linearity coefficients, or any combination thereof.

In some examples, to support performing the digital pre-distortion procedure, the DPD component 740 may be configured as or otherwise support a means for distorting a signal based on the set of non-linearity coefficients before amplifying the signal, where the transmission is based on the signal, and where the amplifying is prior to the transmitting.

In some examples, the downlink transmission is transmitted to a UE of the set of UEs.

In some examples, the downlink transmission is transmitted to a UE excluded from the set of UEs.

Figure 8:
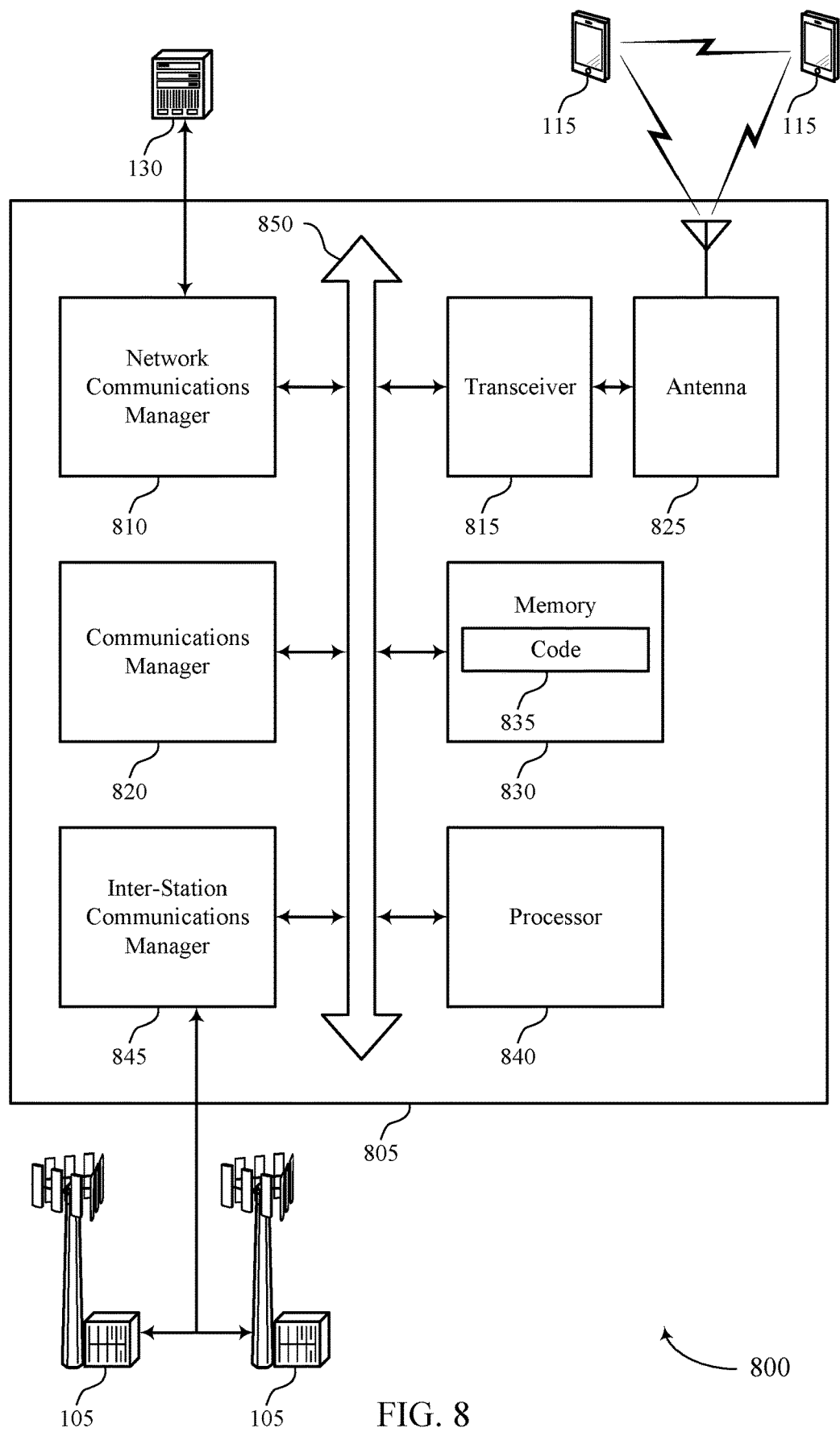
FIG. 8 shows a diagram of a system including a device that supports distributed digital pre-distortion training in accordance with aspects of the present disclosure.

FIG. 8 shows a diagram of a system 800 including a device 805 that supports distributed digital pre-distortion training in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting distributed digital pre-distortion training). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a base station in accordance with examples as disclosed herein. For example, the communications manager 820 may be configured as or otherwise support a means for transmitting, to each UE of a set of UEs, one or more respective training parameters for a digital pre-distortion procedure. The communications manager 820 may be configured as or otherwise support a means for receiving (e.g., from each UE of the set of UEs) one or more respective training values based on the one or more respective training parameters. The communications manager 820 may be configured as or otherwise support a means for determining a set of non-linearity coefficients based on the respective training values. The communications manager 820 may be configured as or otherwise support a means for performing the digital pre-distortion procedure for a downlink transmission, the digital pre-distortion procedure based on the set of non-linearity coefficients. The communications manager 820 may be configured as or otherwise support a means for transmitting, after performing the digital pre-distortion procedure, the downlink transmission.

By including or configuring the communications manager 820 in accordance with examples as described herein, the device 805 may support techniques for the device 805 to enable the set of non-linearity coefficients to be determined using a wider bandwidth, to enable each UE of the set of UEs to perform fewer computations than a single UE calculating the set of non-linearity coefficients, or both. Accordingly, the techniques described herein may increase the efficiency of communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of distributed digital pre-distortion training as described herein, or the processor 840 and the memory 830 may be otherwise configured to perform or support such operations.

Figure 9:
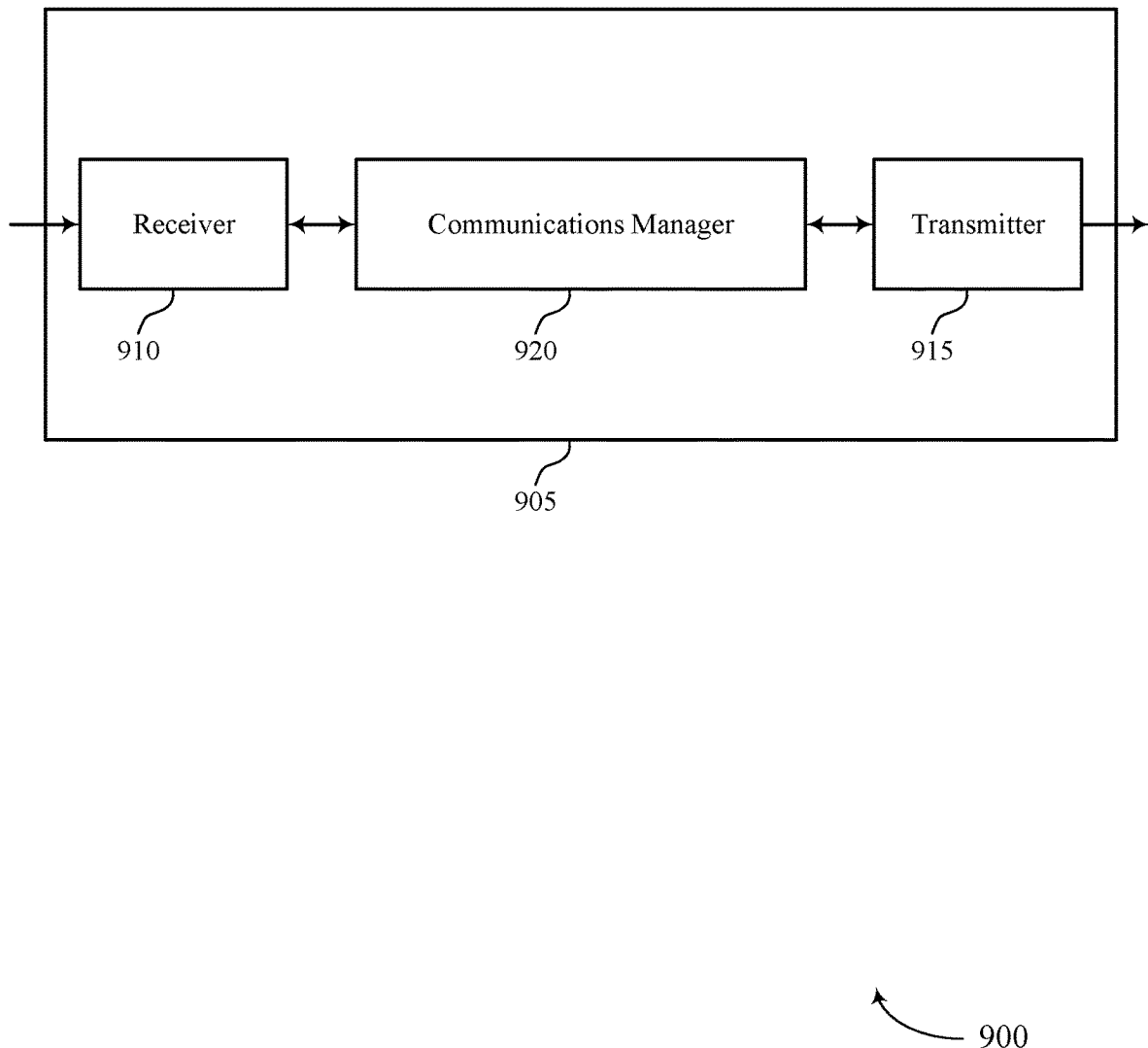
FIGS. 9 and 10 show block diagrams of devices that support distributed digital pre-distortion training in accordance with aspects of the present disclosure.

FIG. 9 shows a block diagram 900 of a device 905 that supports distributed digital pre-distortion training in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to distributed digital pre-distortion training). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to distributed digital pre-distortion training). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of distributed digital pre-distortion training as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving, from a base station, one or more training parameters for a digital pre-distortion procedure associated with the base station. The communications manager 920 may be configured as or otherwise support a means for determining one or more training values associated with the digital pre-distortion procedure based on the one or more training parameters, where the one or more training values support a computation of a set of non-linearity coefficients for the digital pre-distortion procedure. The communications manager 920 may be configured as or otherwise support a means for transmitting the one or more training values to the base station.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for the device 905 to perform fewer computations than a single UE calculating the set of non-linearity coefficients. Accordingly, the techniques described herein may decrease latency associated with communications.

Figure 10:
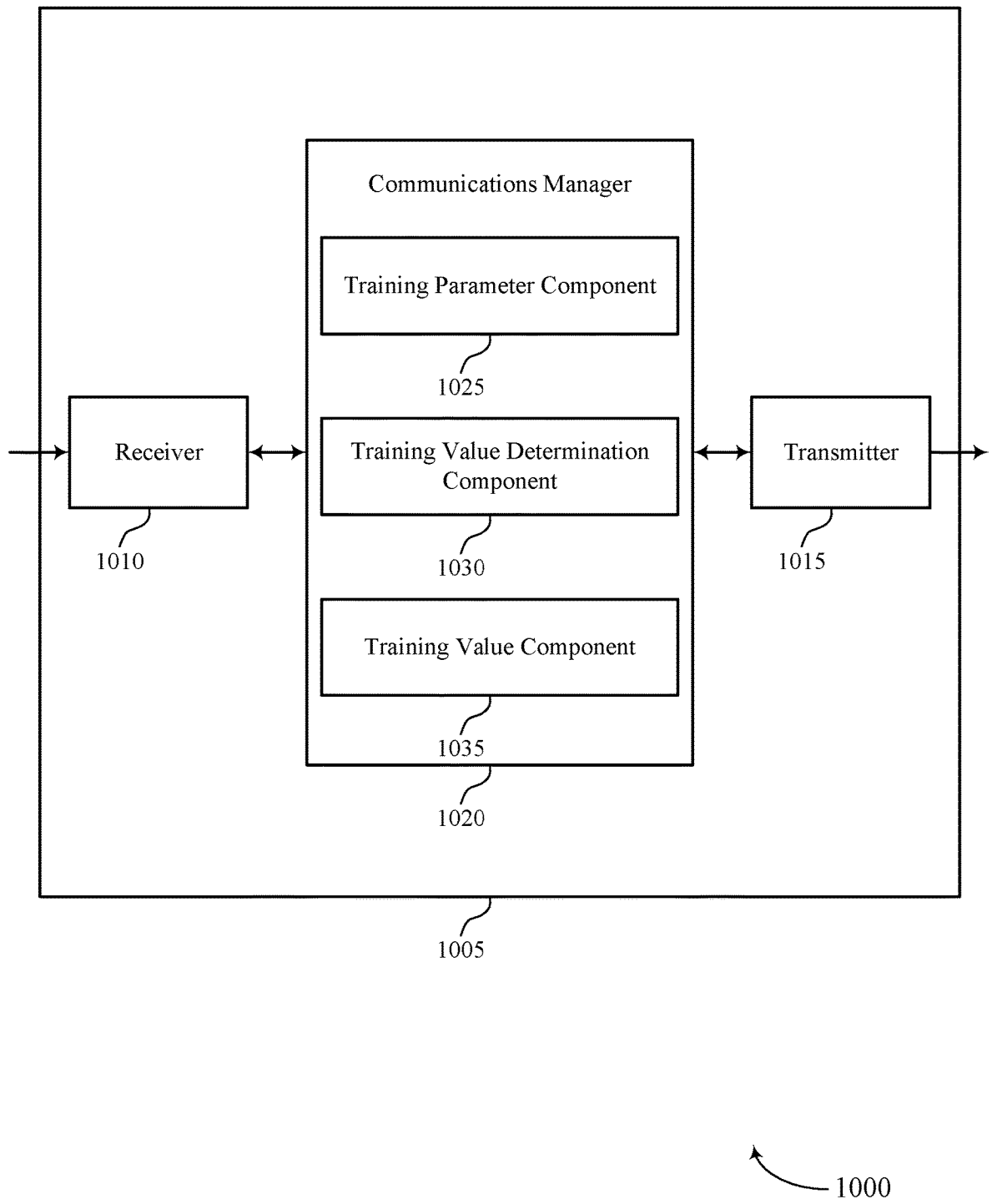

FIG. 10 shows a block diagram 1000 of a device 1005 that supports distributed digital pre-distortion training in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to distributed digital pre-distortion training). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to distributed digital pre-distortion training). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of distributed digital pre-distortion training as described herein. For example, the communications manager 1020 may include a training parameter component 1025, a training value determination component 1030, a training value component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The training parameter component 1025 may be configured as or otherwise support a means for receiving, from a base station, one or more training parameters for a digital pre-distortion procedure associated with the base station. The training value determination component 1030 may be configured as or otherwise support a means for determining one or more training values associated with the digital pre-distortion procedure based on the one or more training parameters, where the one or more training values support a computation of a set of non-linearity coefficients for the digital pre-distortion procedure. The training value component 1035 may be configured as or otherwise support a means for transmitting the one or more training values to the base station.

Figure 11:
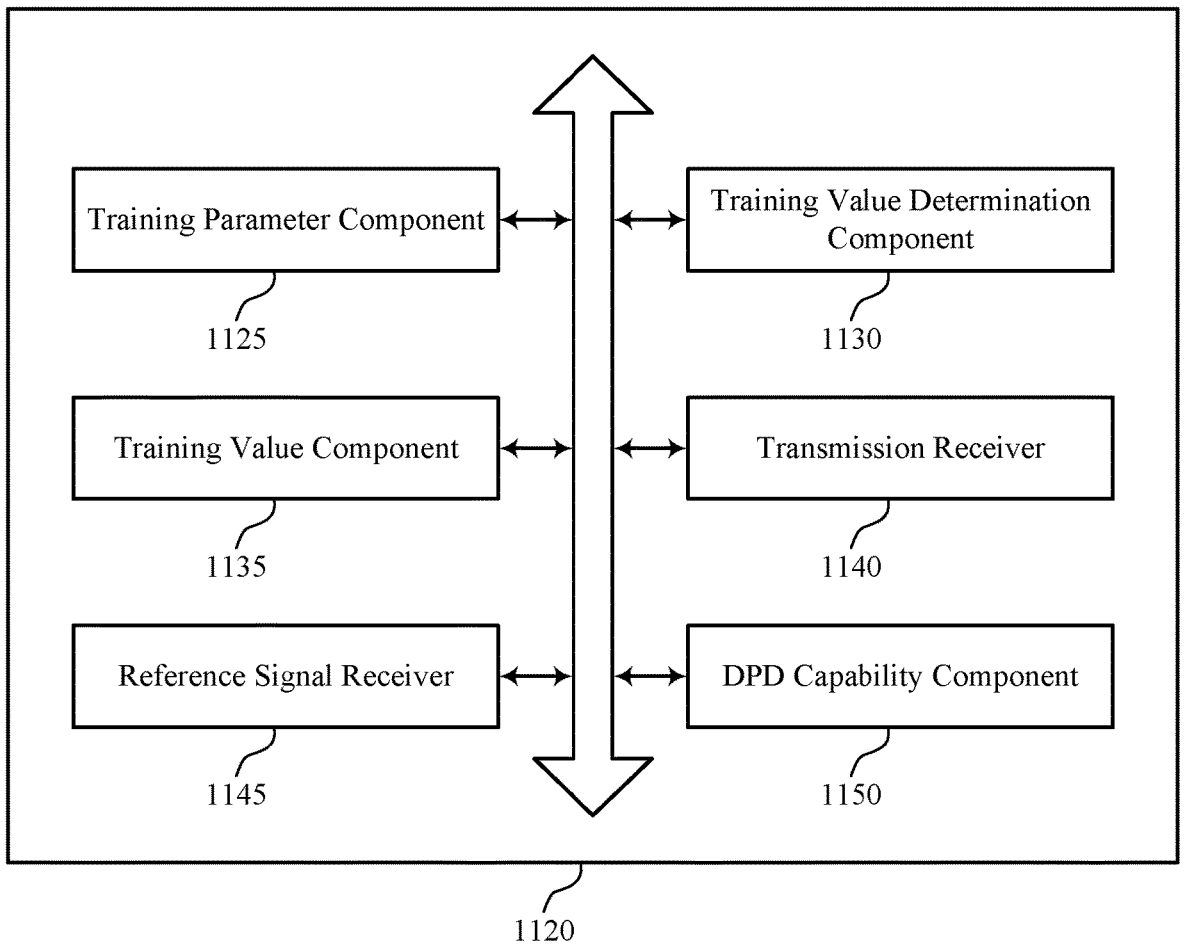
FIG. 11 shows a block diagram of a communications manager that supports distributed digital pre-distortion training in accordance with aspects of the present disclosure.

FIG. 11 shows a block diagram 1100 of a communications manager 1120 that supports distributed digital pre-distortion training in accordance with aspects of the present disclosure. The communications manager 1120 may be an example of aspects of a communications manager 920, a communications manager 1020, or both, as described herein. The communications manager 1120, or various components thereof, may be an example of means for performing various aspects of distributed digital pre-distortion training as described herein. For example, the communications manager 1120 may include a training parameter component 1125, a training value determination component 1130, a training value component 1135, a transmission receiver 1140, a reference signal receiver 1145, a DPD capability component 1150, or any combination thereof. Each of these components may communicate, directly or indirectly, with one another (e.g., via one or more buses).

The communications manager 1120 may support wireless communication at a UE in accordance with examples as disclosed herein. The training parameter component 1125 may be configured as or otherwise support a means for receiving, from a base station, one or more training parameters for a digital pre-distortion procedure associated with the base station. The training value determination component 1130 may be configured as or otherwise support a means for determining one or more training values associated with the digital pre-distortion procedure based on the one or more training parameters, where the one or more training values support a computation of a set of non-linearity coefficients for the digital pre-distortion procedure. The training value component 1135 may be configured as or otherwise support a means for transmitting the one or more training values to the base station.

In some examples, the transmission receiver 1140 may be configured as or otherwise support a means for receiving a transmission from the base station based on transmitting the one or more training values.

In some examples, the reference signal receiver 1145 may be configured as or otherwise support a means for receiving a reference signal from the base station, where the one or more training values are based on the reference signal.

In some examples, the one or more training values include a vector of training values.

In some examples, a conjugate transpose of a kernel matrix, where columns of the kernel matrix respectively correspond to non-linearity kernels and rows of the kernel matrix respectively correspond to equations, each of the equations for a respective portion of a time domain or a frequency domain. In some examples, a diagonal matrix of weighting factors for the UE. In some examples, a target vector including target values for the equations, the target values for the UE.

In some examples, the target vector corresponds to an input to a power amplifier or an output of the power amplifier.

In some examples, the one or more training values further include a matrix of training values.

In some examples, a kernel matrix, where columns of the kernel matrix respectively correspond to non-linearity kernels and rows of the kernel matrix respectively correspond to equations, each of the equations for a respective portion of a time domain or a frequency domain. In some examples, a diagonal matrix of weighting factors for the UE. In some examples, a conjugate transpose of the kernel matrix.

In some examples, the DPD capability component 1150 may be configured as or otherwise support a means for transmitting, to the base station, an indication of a capability to determine the one or more training values, where receiving the one or more training is based on transmitting the indication of the capability.

In some examples, the one or more training parameters include a diagonal matrix of weighting factors for the, a bandwidth for determining the one or more training values, one or more kernels associated with the set of non-linearity coefficients, a sampling rate associated with the set of non-linearity coefficients, or any combination thereof.

Figure 12:
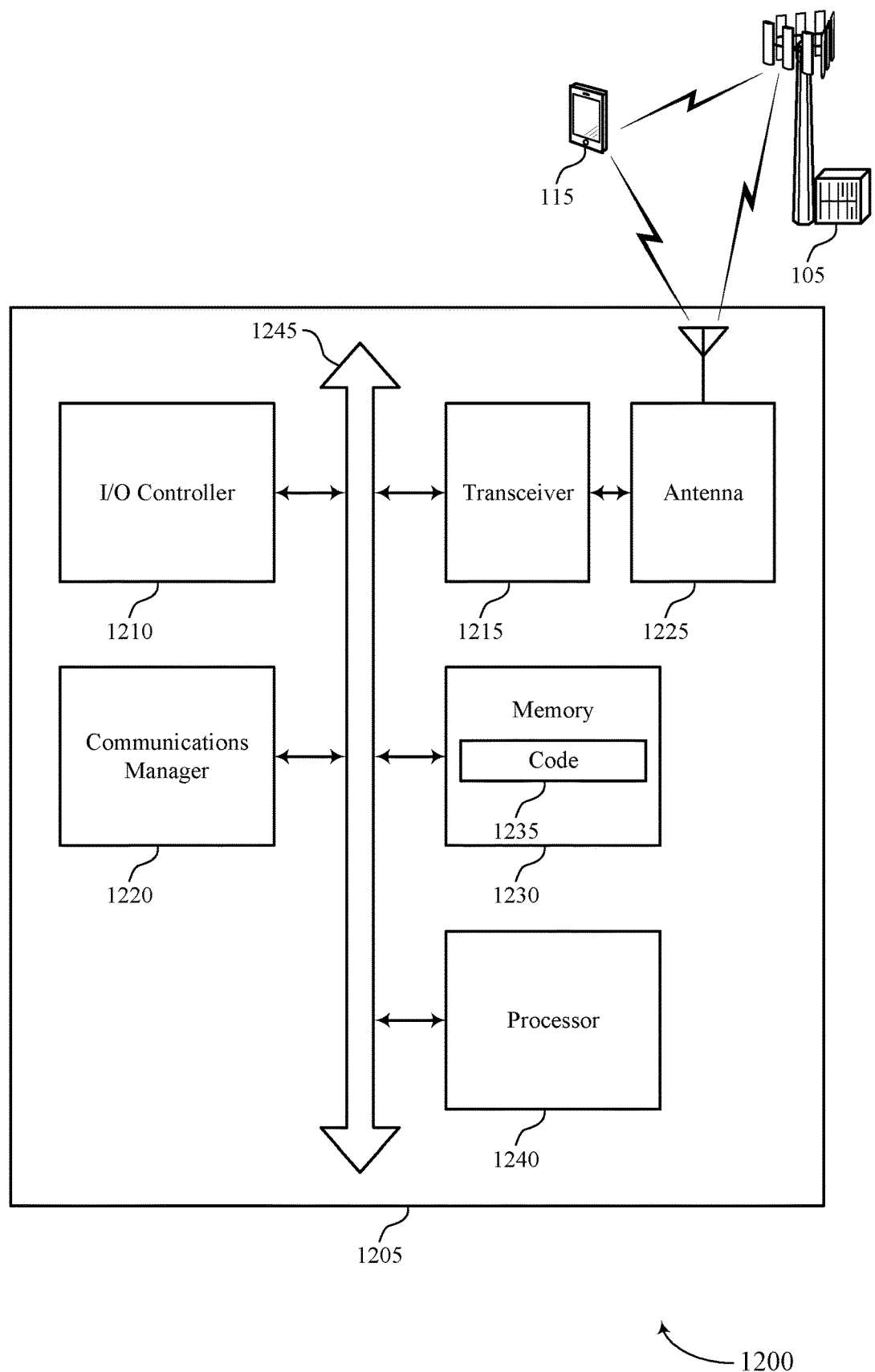
FIG. 12 shows a diagram of a system including a device that supports distributed digital pre-distortion training in accordance with aspects of the present disclosure.

FIG. 12 shows a diagram of a system 1200 including a device 1205 that supports distributed digital pre-distortion training in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting distributed digital pre-distortion training). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving, from a base station, one or more training parameters for a digital pre-distortion procedure associated with the base station. The communications manager 1220 may be configured as or otherwise support a means for determining one or more training values associated with the digital pre-distortion procedure based on the one or more training parameters, where the one or more training values support a computation of a set of non-linearity coefficients for the digital pre-distortion procedure. The communications manager 1220 may be configured as or otherwise support a means for transmitting the one or more training values to the base station.

By including or configuring the communications manager 1220 in accordance with examples as described herein, the device 1205 may support techniques for the device 1205 to perform fewer computations than a single UE calculating the set of non-linearity coefficients. Accordingly, the techniques described herein may decrease latency associated with communications In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of distributed digital pre-distortion training as described herein, or the processor 1240 and the memory 1230 may be otherwise configured to perform or support such operations.

Figure 13:
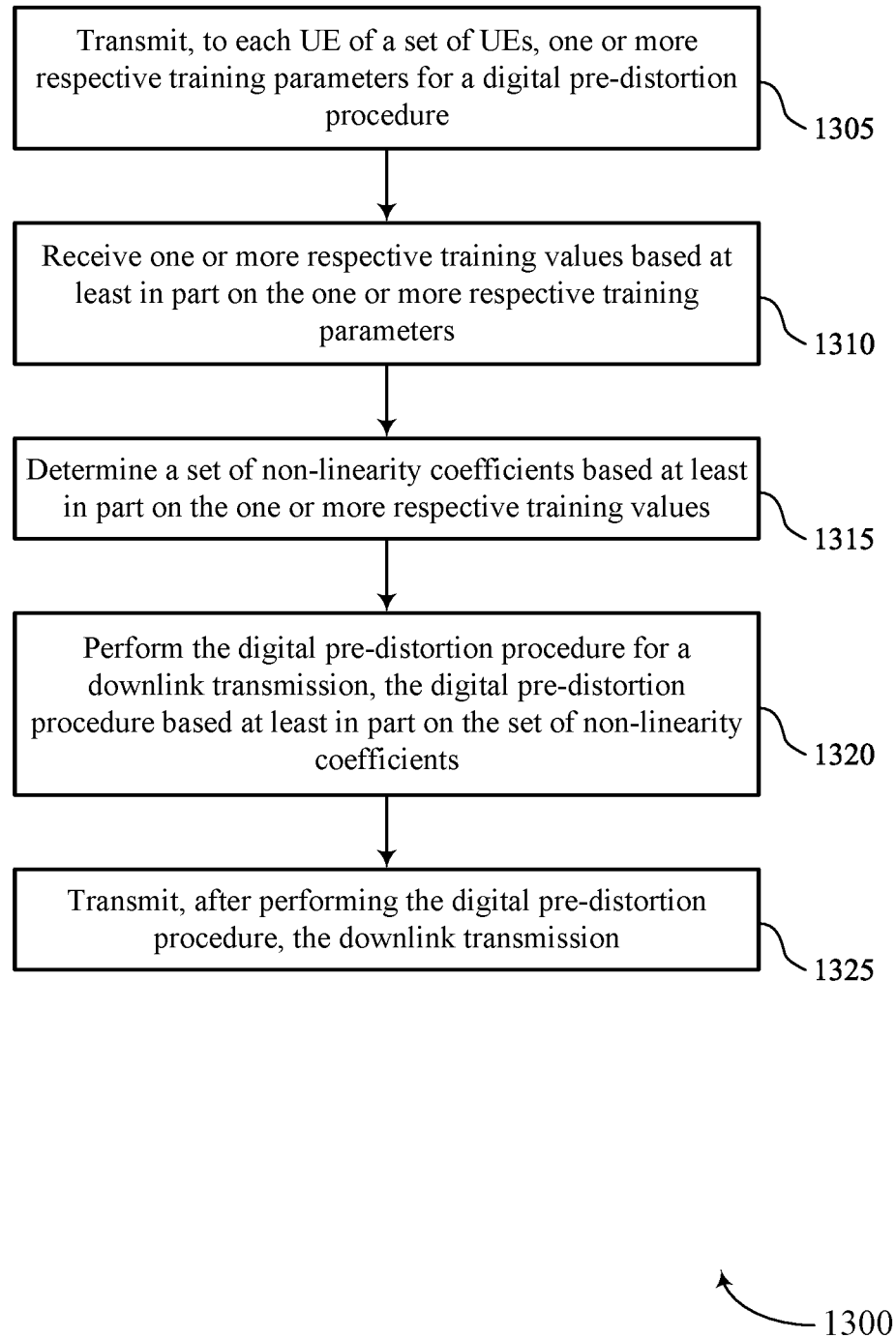
FIGS. 13 and 14 show flowcharts illustrating methods that support distributed digital pre-distortion training in accordance with aspects of the present disclosure.

FIG. 13 shows a flowchart illustrating a method 1300 that supports distributed digital pre-distortion training in accordance with aspects of the present disclosure. The operations of the method 1300 may be implemented by a base station or its components as described herein. For example, the operations of the method 1300 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1305, the method may include transmitting, to each UE of a set of UEs, one or more respective training parameters for a digital pre-distortion procedure. The operations of 1305 may be performed in accordance with examples as disclosed herein. In some examples, aspects of the operations of 1305 may be performed by a training parameter component 725 as described with reference to FIG. 7.

At 1310, the method may include receiving (e.g., from each UE of the set of UEs) one or more respective training values based on the one or more respective training parameters. The operations of 1310 may be performed in accordance with examples as disclosed herein. In some examples, aspects of the operations of 1310 may be performed by a training value component 730 as described with reference to FIG. 7.

At 1315, the method may include determining a set of non-linearity coefficients based on the respective training values. The operations of 1315 may be performed in accordance with examples as disclosed herein. In some examples, aspects of the operations of 1315 may be performed by a non-linearity coefficient determination component 735 as described with reference to FIG. 7.

At 1320, the method may include performing the digital pre-distortion procedure for a downlink transmission, the digital pre-distortion procedure based on the set of non-linearity coefficients. The operations of 1320 may be performed in accordance with examples as disclosed herein. In some examples, aspects of the operations of 1320 may be performed by a DPD component 740 as described with reference to FIG. 7.

At 1325, the method may include transmitting, after performing the digital pre-distortion procedure, the downlink transmission. The operations of 1325 may be performed in accordance with examples as disclosed herein. In some examples, aspects of the operations of 1325 may be performed by a downlink transmission transmitter 745 as described with reference to FIG. 7.

Figure 14:
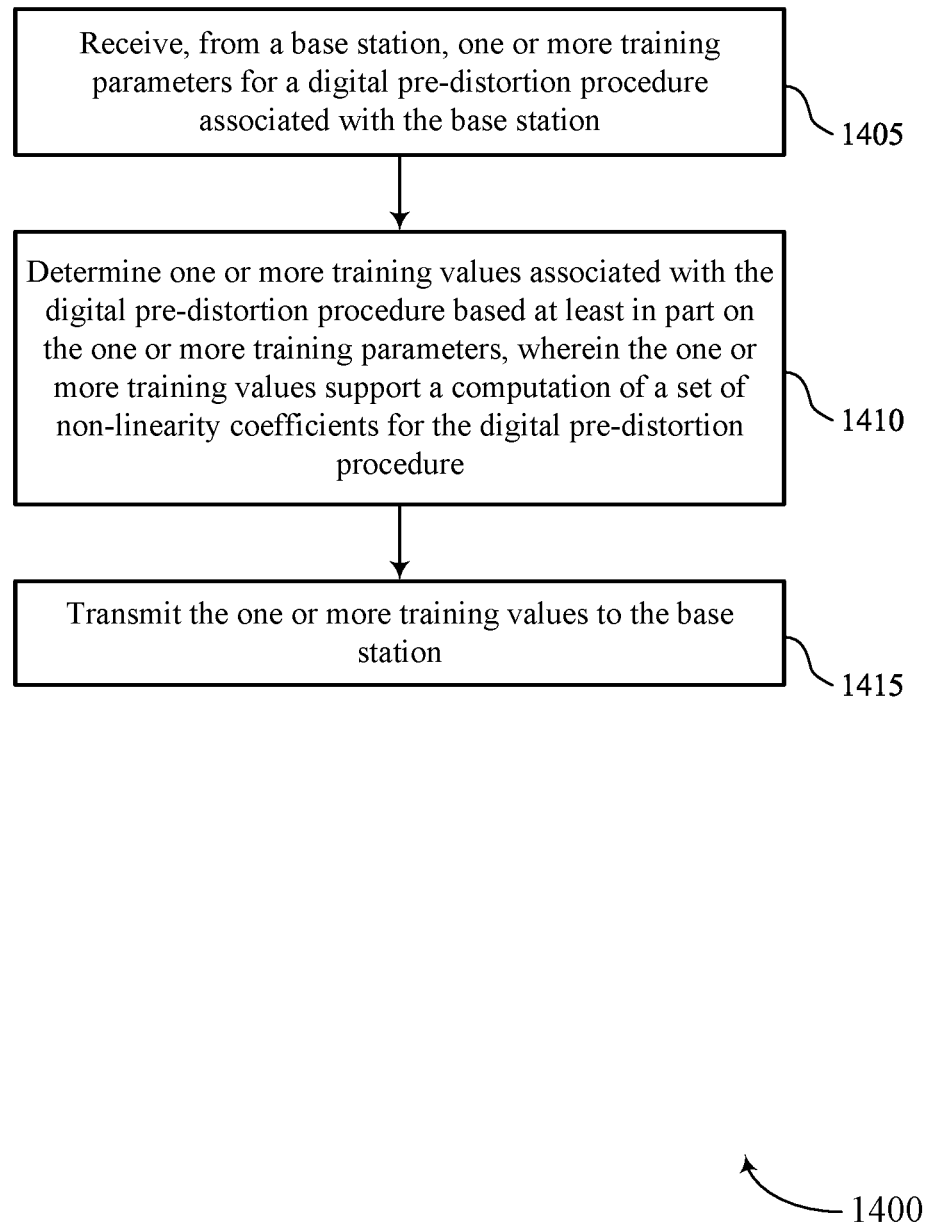

FIG. 14 shows a flowchart illustrating a method 1400 that supports distributed digital pre-distortion training in accordance with aspects of the present disclosure. The operations of the method 1400 may be implemented by a UE or its components as described herein. For example, the operations of the method 1400 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, one or more training parameters for a digital pre-distortion procedure associated with the base station. The operations of 1405 may be performed in accordance with examples as disclosed herein. In some examples, aspects of the operations of 1405 may be performed by a training parameter component 1125 as described with reference to FIG. 11.

At 1410, the method may include determining one or more training values associated with the digital pre-distortion procedure based on the one or more training parameters, where the one or more training values support a computation of a set of non-linearity coefficients for the digital pre-distortion procedure. The operations of 1410 may be performed in accordance with examples as disclosed herein. In some examples, aspects of the operations of 1410 may be performed by a training value determination component 1130 as described with reference to FIG. 11.

At 1415, the method may include transmitting the one or more training values to the base station. The operations of 1415 may be performed in accordance with examples as disclosed herein. In some examples, aspects of the operations of 1415 may be performed by a training value component 1135 as described with reference to FIG. 11.

Aspect 1: A method for wireless communication at a base station, comprising: transmitting, to each UE of a set of UEs, one or more respective training parameters for a digital pre-distortion procedure; receiving (e.g., from each UE of the set of UEs) one or more respective training values based at least in part on the one or more respective training parameters; determining a set of non-linearity coefficients based at least in part on the one or more respective training values; performing the digital pre-distortion procedure for a downlink transmission, the digital pre-distortion procedure based at least in part on the set of non-linearity coefficients; and transmitting, after performing the digital pre-distortion procedure, the downlink transmission.

Aspect 2: The method of aspect 1, further comprising: transmitting respective reference signals to each UE of the set of UEs, wherein the one or more respective training values are based at least in part on the respective reference signals.

Aspect 3: The method of any of aspects 1 through 2, wherein the one or more respective training values comprise respective vectors of training values each for a respective UE of the set of UEs; and determining the set of non-linearity coefficients is based at least in part on the respective vectors for the set of UEs.

Aspect 4: The method of aspect 3, wherein each of the respective vectors is based at least in part on a conjugate transpose of a kernel matrix, wherein columns of the kernel matrix respectively correspond to non-linearity kernels and rows of the kernel matrix respectively correspond to equations, each of the equations for a respective portion of a time domain or a frequency domain; a diagonal matrix of weighting factors for the respective UE; and a target vector comprising target values for the equations, the target values for the respective UE.

Aspect 5: The method of aspect 4, wherein the target vector corresponds to an input to a power amplifier.

Aspect 6: The method of any of aspects 4 through 5, wherein the target vector corresponds to an output from a power amplifier.

Aspect 7: The method of any of aspects 3 through 6, further comprising: identifying a respective matrix for each UE of the set of UEs, wherein determining the set of non-linearity coefficients is further based at least in part on the respective matrices for the set of UEs.

Aspect 8: The method of aspect 7, wherein the one or more respective training values further comprise the respective matrix for each UE of the set of UEs.

Aspect 9: The method of any of aspects 7 through 8, wherein each of the respective matrices is based at least in part on a kernel matrix, wherein columns of the kernel matrix respectively correspond to non-linearity kernels and rows of the kernel matrix respectively correspond to equations, each of the equations for a respective portion of a time domain or a frequency domain; a diagonal matrix of weighting factors for the respective UE; and a conjugate transpose of the kernel matrix.

Aspect 10: The method of any of aspects 7 through 9, further comprising: identifying a respective scalar value for each UE of the set of UEs; and determining, for each UE of the set of UEs, a respective first product based at least in part on a multiplication of the respective scalar value with the respective vector of training values, wherein determining the set of non-linearity coefficients is based at least in part on the respective first product for each UE of the set of UEs.

Aspect 11: The method of aspect 10, further comprising: determining, for each UE of the set of UEs, a respective second product based at least in part on a multiplication of the respective scalar value with the respective matrix, wherein determining the set of non-linearity coefficients is based at least in part on the respective second product for each UE of the set of UEs.

Aspect 12: The method of aspect 11, further comprising: aggregating the respective first products for each UE of the set of UEs; and aggregating the respective second products for each UE of the set of UEs, wherein determining the set of non-linearity coefficients is based at least in part on aggregating the respective first products and aggregating the respective second products for each UE of the set of UEs.

Aspect 13: The method of aspect 12, wherein determining the set of non-linearity coefficients comprises: obtaining an aggregated vector based at least in part on aggregating the respective first products; and obtaining an aggregated matrix based at least in part on aggregating the respective second products; and multiplying an inverse of the aggregated matrix with the aggregated vector, wherein determining the set of non-linearity coefficients is based at least in part on multiplying the inverse of the aggregated matrix with the aggregated vector.

Aspect 14: The method of any of aspects 1 through 13, further comprising: receiving, from each UE of the set of UEs, a respective indication of a capability to determine the one or more respective training values, wherein transmitting the one or more respective training parameters to each UE of the set of UEs is based at least in part on receiving the respective indication of the capability from each UE of the set of UEs.

Aspect 15: The method of any of aspects 1 through 14, wherein the one or more respective training parameters comprise respective diagonal matrices of weighting factors for each UE of the set of UEs, respective bandwidths for which each UE of the set of UEs is to determine the one or more respective training values, one or more kernels associated with the set of non-linearity coefficients, a sampling rate associated with the set of non-linearity coefficients, or any combination thereof.

Aspect 16: The method of any of aspects 1 through 15, wherein performing the digital pre-distortion procedure comprises: distorting a signal based at least in part on the set of non-linearity coefficients before amplifying the signal, wherein the downlink transmission is based at least in part on the signal, and wherein the amplifying is prior to the transmitting.

Aspect 17: The method of any of aspects 1 through 16, wherein the downlink transmission is transmitted to a UE of the set of UEs.

Aspect 18: The method of any of aspects 1 through 17, wherein the downlink transmission is transmitted to a UE excluded from the set of UEs.

Aspect 19: A method for wireless communication at a UE, comprising: receiving, from a base station, one or more training parameters for a digital pre-distortion procedure associated with the base station; determining one or more training values associated with the digital pre-distortion procedure based at least in part on the one or more training parameters, wherein the one or more training values support a computation of a set of non-linearity coefficients for the digital pre-distortion procedure; and transmitting the one or more training values to the base station.

Aspect 20: The method of aspect 19, further comprising: receiving a transmission from the base station based at least in part on transmitting the one or more training values.

Aspect 21: The method of any of aspects 19 through 20, further comprising: receiving a reference signal from the base station, wherein the one or more training values are based at least in part on the reference signal.

Aspect 22: The method of any of aspects 19 through 21, wherein the one or more training values comprise a vector of training values.

Aspect 23: The method of any of aspects 19 through 22, wherein the one or more training values comprise a vector of training values, and wherein the vector of training values is based at least in part on a conjugate transpose of a kernel matrix, wherein columns of the kernel matrix respectively correspond to non-linearity kernels and rows of the kernel matrix respectively correspond to equations, each of the equations for a respective portion of a time domain or a frequency domain; a diagonal matrix of weighting factors for the UE; and a target vector comprising target values for the equations, the target values for the UE.

Aspect 24: The method of aspect 23, wherein the target vector corresponds to an input to a power amplifier or an output of the power amplifier.

Aspect 25: The method of any of aspects 19 through 24, wherein the one or more training values further comprise a matrix of training values.

Aspect 26: The method of aspect 25, wherein the matrix of training values is based at least in part on a kernel matrix, wherein columns of the kernel matrix respectively correspond to non-linearity kernels and rows of the kernel matrix respectively correspond to equations, each of the equations for a respective portion of a time domain or a frequency domain; a diagonal matrix of weighting factors for the UE; and a conjugate transpose of the kernel matrix.

Aspect 27: The method of any of aspects 19 through 26, further comprising: transmitting, to the base station, an indication of a capability to determine the one or more training values, wherein receiving the one or more training is based at least in part on transmitting the indication of the capability.

Aspect 28: The method of any of aspects 19 through 27, wherein the one or more training parameters comprise a diagonal matrix of weighting factors for the, a bandwidth for determining the one or more training values, one or more kernels associated with the set of non-linearity coefficients, a sampling rate associated with the set of non-linearity coefficients, or any combination thereof.

Aspect 29: An apparatus for wireless communication at a base station, comprising a processor; memory coupled with the processor; and instructions stored in the memory and executable by the processor to cause the apparatus to perform a method of any of aspects 1 through 18.

Aspect 30: An apparatus for wireless communication at a base station, comprising at least one means for performing a method of any of aspects 1 through 18.

Aspect 31: A non-transitory computer-readable medium storing code for wireless communication at a base station, the code comprising instructions executable by a processor to perform a method of any of aspects 1 through 18.

Aspect 32: An apparatus for wireless communication at a UE, comprising a processor; memory coupled with the processor; and instructions stored in the memory and executable by the processor to cause the apparatus to perform a method of any of aspects 19 through 28.

Aspect 33: An apparatus for wireless communication at a UE, comprising at least one means for performing a method of any of aspects 19 through 28.

Aspect 34: A non-transitory computer-readable medium storing code for wireless communication at a UE, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a base station, comprising:
   transmitting, to each user equipment (UE) of a set of UEs, one or more respective training parameters for a digital pre-distortion procedure;
   receiving one or more respective training values based at least in part on the one or more respective training parameters;
   determining a set of non-linearity coefficients based at least in part on the one or more respective training values;
   performing the digital pre-distortion procedure for a downlink transmission, the digital pre-distortion procedure based at least in part on the set of non-linearity coefficients; and
   transmitting, after performing the digital pre-distortion procedure, the downlink transmission.

2. The method of claim 1, further comprising:
   transmitting respective reference signals to each UE of the set of UEs, wherein the one or more respective training values are based at least in part on the respective reference signals.

3. The method of claim 1, wherein:
   the one or more respective training values comprise respective vectors of training values each for a respective UE of the set of UEs; and
   determining the set of non-linearity coefficients is based at least in part on the respective vectors for the set of UEs.

4. The method of claim 3, wherein each of the respective vectors is based at least in part on:
   a conjugate transpose of a kernel matrix, wherein columns of the kernel matrix respectively correspond to non-linearity kernels and rows of the kernel matrix respectively correspond to equations, each of the equations for a respective portion of a time domain or a frequency domain;
   a diagonal matrix of weighting factors for the respective UE; and
   a target vector comprising target values for the equations, the target values for the respective UE.

5. The method of claim 4, wherein the target vector corresponds to an input to a power amplifier.

6. The method of claim 4, wherein the target vector corresponds to an output from a power amplifier.

7. The method of claim 3, further comprising:
   identifying a respective matrix for each UE of the set of UEs, wherein determining the set of non-linearity coefficients is further based at least in part on the respective matrices for the set of UEs.

8. The method of claim 7, wherein the one or more respective training values further comprise the respective matrix for each UE of the set of UEs.

9. The method of claim 7, wherein each of the respective matrices is based at least in part on:

a kernel matrix, wherein columns of the kernel matrix respectively correspond to non-linearity kernels and rows of the kernel matrix respectively correspond to equations, each of the equations for a respective portion of a time domain or a frequency domain;

a diagonal matrix of weighting factors for the respective UE; and a conjugate transpose of the kernel matrix.

10. The method of claim 7, further comprising:

identifying a respective scalar value for each UE of the set of UEs; and determining, for each UE of the set of UEs, a respective first product based at least in part on a multiplication of the respective scalar value with the respective vector of training values, wherein determining the set of non-linearity coefficients is based at least in part on the respective first product for each UE of the set of UEs.

11. The method of claim 10, further comprising:

determining, for each UE of the set of UEs, a respective second product based at least in part on a multiplication of the respective scalar value with the respective matrix, wherein determining the set of non-linearity coefficients is based at least in part on the respective second product for each UE of the set of UEs.

12. The method of claim 11, further comprising:

aggregating the respective first products for each UE of the set of UEs; and aggregating the respective second products for each UE of the set of UEs, wherein determining the set of non-linearity coefficients is based at least in part on aggregating the respective first products and aggregating the respective second products for each UE of the set of UEs.

13. The method of claim 12, wherein determining the set of non-linearity coefficients comprises:

obtaining an aggregated vector based at least in part on aggregating the respective first products; and obtaining an aggregated matrix based at least in part on aggregating the respective second products; and multiplying an inverse of the aggregated matrix with the aggregated vector, wherein determining the set of non-linearity coefficients is based at least in part on multiplying the inverse of the aggregated matrix with the aggregated vector.

14. The method of claim 1, further comprising:

receiving, from each UE of the set of UEs, a respective indication of a capability to determine the one or more respective training values, wherein transmitting the one or more respective training parameters to each UE of the set of UEs is based at least in part on receiving the respective indication of the capability from each UE of the set of UEs.

15. The method of claim 1, wherein the one or more respective training parameters comprise respective diagonal matrices of weighting factors for each UE of the set of UEs, respective bandwidths for which each UE of the set of UEs is to determine the one or more respective training values, one or more kernels associated with the set of non-linearity coefficients, a sampling rate associated with the set of non-linearity coefficients, or any combination thereof.

16. The method of claim 1, wherein performing the digital pre-distortion procedure comprises:

distorting a signal based at least in part on the set of non-linearity coefficients before amplifying the signal, wherein the downlink transmission is based at least in part on the signal, and wherein the amplifying is prior to the transmitting.

17. The method of claim 1, wherein the downlink transmission is transmitted to a UE of the set of UEs.

18. The method of claim 1, wherein the downlink transmission is transmitted to a UE excluded from the set of UEs.

19. A method for wireless communication at a user equipment (UE), comprising:

receiving, from a base station, one or more training parameters for a digital pre-distortion procedure associated with the base station;

determining one or more training values associated with the digital pre-distortion procedure based at least in part on the one or more training parameters, wherein the one or more training values support a computation of a set of non-linearity coefficients for the digital pre-distortion procedure; and transmitting the one or more training values to the base station.

20. The method of claim 19, further comprising:

receiving a transmission from the base station based at least in part on transmitting the one or more training values.

21. The method of claim 19, further comprising:

receiving a reference signal from the base station, wherein the one or more training values are based at least in part on the reference signal.

22. The method of claim 19, wherein the one or more training values comprise a vector of training values.

23. The method of claim 19, wherein the one or more training values comprise a vector of training values, and wherein the vector of training values is based at least in part on:

a conjugate transpose of a kernel matrix, wherein columns of the kernel matrix respectively correspond to non-linearity kernels and rows of the kernel matrix respectively correspond to equations, each of the equations for a respective portion of a time domain or a frequency domain;

a diagonal matrix of weighting factors for the UE; and a target vector comprising target values for the equations, the target values for the UE.

24. The method of claim 23, wherein the target vector corresponds to an input to a power amplifier or an output of the power amplifier.

25. The method of claim 19, wherein the one or more training values further comprise a matrix of training values.

26. The method of claim 25, wherein the matrix of training values is based at least in part on:

a kernel matrix, wherein columns of the kernel matrix respectively correspond to non-linearity kernels and rows of the kernel matrix respectively correspond to equations, each of the equations for a respective portion of a time domain or a frequency domain;

a diagonal matrix of weighting factors for the UE; and a conjugate transpose of the kernel matrix.

27. The method of claim 19, further comprising:

transmitting, to the base station, an indication of a capability to determine the one or more training values, wherein receiving the one or more training is based at least in part on transmitting the indication of the capability.

28. The method of claim 19, wherein the one or more training parameters comprise a diagonal matrix of weighting factors for the, a bandwidth for determining the one or more training values, one or more kernels associated with the set of non-linearity coefficients, a sampling rate associated with the set of non-linearity coefficients, or any combination thereof.

29. An apparatus for wireless communication at a base station, comprising:
- a processor;
- memory coupled with the processor; and
- instructions stored in the memory and executable by the processor to cause the apparatus to:
  - transmit, to each user equipment (UE) of a set of UEs, one or more respective training parameters for a digital pre-distortion procedure;
  - receive one or more respective training values based at least in part on the one or more respective training parameters;
  - determine a set of non-linearity coefficients based at least in part on the respective training values;
  - perform the digital pre-distortion procedure for a downlink transmission, the digital pre-distortion procedure based at least in part on the set of non-linearity coefficients; and
  - transmit, after performing the digital pre-distortion procedure, the downlink transmission.

30. An apparatus for wireless communication at a user equipment (UE), comprising:
- a processor;
- memory coupled with the processor; and
- instructions stored in the memory and executable by the processor to cause the apparatus to:
  - receive, from a base station, one or more training parameters for a digital pre-distortion procedure associated with the base station;
  - determine one or more training values associated with the digital pre-distortion procedure based at least in part on the one or more training parameters, wherein the one or more training values support a computation of a set of non-linearity coefficients for the digital pre-distortion procedure; and
  - transmit the one or more training values to the base station.

* * * * *